(12) United States Patent
Xu et al.

(10) Patent No.: US 10,824,849 B2
(45) Date of Patent: Nov. 3, 2020

(54) METHOD, APPARATUS, AND SYSTEM FOR RESOURCE TRANSFER

(71) Applicant: Advanced New Technologies Co., Ltd., George Town, Grand Cayman (KY)

(72) Inventors: Wei Xu, Beijing (CN); Jidong Chen, Beijing (CN)

(73) Assignee: Advanced New Technologies Co., Ltd., George Town, Grand Cayman (KY)

( * ) Notice: Subject to any disclaimer, the term of this patent is extended or adjusted under 35 U.S.C. 154(b) by 0 days.

(21) Appl. No.: 16/552,683

(22) Filed: Aug. 27, 2019

(65) Prior Publication Data

US 2020/0074148 A1 Mar. 5, 2020

(30) Foreign Application Priority Data

Sep. 4, 2018 (CN) .......................... 2018 1 1024632

(51) Int. Cl.
*G06K 9/00* (2006.01)
*G06K 9/62* (2006.01)
*G06Q 20/40* (2012.01)

(52) U.S. Cl.
CPC ..... *G06K 9/00248* (2013.01); *G06K 9/00268* (2013.01); *G06K 9/00308* (2013.01);
(Continued)

(58) Field of Classification Search
CPC ........... G06K 9/00248; G06K 9/00906; G06K 9/00308; G06K 9/00268; G06K 9/6256; G06Q 20/40145
See application file for complete search history.

(56) References Cited

U.S. PATENT DOCUMENTS 5,906,005 A * 5/1999 Niskala ..................... G03C 5/04
2/173
2013/0188840 A1* 7/2013 Ma ........................ G06K 9/00261
382/107

(Continued)

FOREIGN PATENT DOCUMENTS

CN 103268497 A 8/2013
CN 107330314 A 11/2017
(Continued)

OTHER PUBLICATIONS

International Search Report and Written Opinion dated Oct. 17, 2019, in counterpart International Application No. PCT/US2019/048259.

(Continued)

*Primary Examiner* — Bobbak Safaipour
(74) *Attorney, Agent, or Firm* — Finnegan, Henderson, Farabow, Garrett & Dunner, L.L.P.

(57) ABSTRACT

A method for resource transfer, includes: acquiring a front face image, and a side face image from at least one side, of a target user; performing a liveness detection and an identity recognition on the target user based on the front face image and the side face image; and executing, if a liveness detection result is that the target user is a live user and an identity recognition result is that the target user is an authorized user of a target electronic account, resource transfer on the target electronic account.

13 Claims, 18 Drawing Sheets

100

Acquiring a front face image, and a side face image from at least one side, of a target user 102

Performing liveness detection and identity recognition on the target user based on the front face image and the side face image 104

Executing, if the liveness detection result is that the target user is a live user and the identity recognition result is that the target user is an authorized user of a target electronic account, resource transfer on the target electronic account 106

(52) U.S. Cl.
CPC ....... G06K 9/00906 (2013.01); G06K 9/6256 (2013.01); G06Q 20/40145 (2013.01)

(56) References Cited

U.S. PATENT DOCUMENTS

| | | | | |
|---|---|---|---|---|
| 2016/0366129 | A1* | 12/2016 | Chen | G06F 21/32 |
| 2018/0060648 | A1* | 3/2018 | Yoo | G06K 9/00268 |
| 2018/0101721 | A1* | 4/2018 | Nienhouse | G06N 7/005 |
| 2018/0307815 | A1* | 10/2018 | Samadani | H04N 5/23219 |
| 2019/0370532 | A1* | 12/2019 | Soni | G06K 9/6271 |

FOREIGN PATENT DOCUMENTS

| | | |
|---|---|---|
| CN | 107590463 A | 1/2018 |
| CN | 107609471 A | 1/2018 |
| CN | 107609877 A | 1/2018 |
| CN | 107657161 A | 2/2018 |
| CN | 107786487 A | 3/2018 |
| CN | 108319837 A | 7/2018 |

OTHER PUBLICATIONS

Annu, "Liveness Detection in Face Recognition Using Euclidean Distances," International Journal for Advance Research in Engineering and Technology (May 2013), 1:1-5.

Tan et al., "Application of Interactive Multi-Biometrics Recognition on E-Commerce," Telecommunications Science (Sep. 25, 2015), pp. 2015277-1-2015277-6.

* cited by examiner

METHOD, APPARATUS, AND SYSTEM FOR RESOURCE TRANSFER

CROSS-REFERENCE TO RELATED APPLICATIONS

This application is based upon and claims priority to Chinese Patent Application No. 201811024632.6, filed on Sep. 4, 2018, the entire intent of all of which is incorporated herein by reference.

TECHNICAL FIELD

The present application relates to the field of the Internet, and more particularly, to a method, apparatus, and system for resource transfer.

TECHNICAL BACKGROUND

With the rapid development of information technologies, people can use us terminals, such as mobile phones, tablet computers, and vending machines, to perform resource transfer. When a user intends to use a terminal for resource transfer, in order to protect the security of an electronic account of the user, generally only after the user enters a correct payment password, will resource transfer on the electronic account be executed, thereby completing resource transfer.

However, the mode of resource transfer by password authentication may cause password leakage, resulting in a problem of security risks in electronic accounts. Or, when the user forgets the password, resource transfer cannot be carried out.

Therefore, how to improve the security of users' electronic accounts and enable users to transfer resources without entering their passwords has become a technical problem to be solved.

SUMMARY

An objective of embodiments of the specification is to provide a method, apparatus, and system for resource transfer. During resource transfer, whether a target user is an authorized user of a target electronic account is verified by an identity recognition based on a front face image and a side face image of the target user, and resource transfer can be carried out without entering a password by a user, thereby avoiding a situation that resource transfer cannot be carried out because the user forgets the password. In addition, whether the target user is a live user is verified by a liveness detection based on the front face image and the side face image, avoiding the problem of security risks in electronic accounts caused by face images of users being acquired by others, thereby improving the security of the electronic accounts. Moreover, more feature information is added by combining the front face image and the side face image during the liveness detection and the identity recognition, thereby improving the accuracy of the liveness detection and the identity recognition, and further protecting the security of users' electronic accounts.

In an embodiment, a method for resource transfer includes: acquiring a front face image, and a side face image from at least one side, of a target user; performing a liveness detection and an identity recognition on the target user based on the front face image and the side face image; and executing, if a liveness detection result is that the target user is a live user and an identity recognition result is that the target user is an authorized user of a target electronic account, resource transfer on the target electronic account.

In an embodiment, an apparatus for resource transfer includes: an acquisition module configured to acquire a front face image, and a side face image from at least one side, of a target user; an identification module configured to perform a liveness detection and an identity recognition on the target user based on the front face image and the side face image; and an execution module configured to execute, if a liveness detection result is that the target user is a live user and an identity recognition result is that the target user is an authorized user of a target electronic account, resource transfer on the target electronic account.

In an embodiment, a system for resource transfer includes: a client terminal device and a resource transfer server, wherein the client terminal device is provided with a front face image capturing device and at least one side face image capturing device; wherein the client terminal device is configured to control the front face image capturing device to capture a front face image of a target user and the at least one side face image capturing device to capture a side face image of the target user simultaneously; and send the front face image and the side face image to the resource transfer server; and the resource transfer server is configured to acquire the front face image and the side face image of the target user; perform a liveness detection and an identity recognition on the target user based on the front face image and the side face image; and execute, if a liveness detection result is that the target user is a live user and an identity recognition result is that the target user is an authorized user of a target electronic account, resource transfer on the target electronic account.

In an embodiment, a device for resource transfer includes: a processor; and a memory configured to store instructions, wherein the processor is configured to execute the instructions to: acquire; a front face image, and a side face image from at least one side, of a target user; perform a liveness detection and an identity recognition on the target user based on the front face image and the side face image; and execute, if a liveness detection result is that the target user is a live user and an identity recognition result is that the target user is an authorized user of a target electronic account, resource transfer on the target electronic account.

In an embodiment, a storage medium has stored thereon computer executable instructions that, when executed by a process of a device, cause the device to perform a method for resource transfer, the method including: acquiring a front face image, and a side face image from at least one side, of a target user; performing a liveness detection and an identity recognition on the target user based on the front face image and the side face image; and executing, if a liveness detection result is that the target user is a live user and an identity recognition result is that the target user is an authorized user of a target electronic account, resource transfer on the target electronic account.

According to the technical solutions provided in the embodiments, whether a target user is an authorized user of a target electronic account is verified by an identity recognition based on a front face image and a side face image of the target user during resource transfer, and resource transfer can be carried out without entering a password by a user, thereby avoiding a situation that resource transfer cannot be carried out because the user forgets the password. In addition, whether the target user is a live user is verified by a liveness detection based on the front face image and the side face image, avoiding the problem of security risks in electronic accounts caused by face images of users being acquired by others, thereby improving the security of the electronic accounts. Moreover, more feature information is added by combining the front face image and the side face image during the liveness detection and the identity recognition, thereby improving the accuracy of the liveness detection and the identity recognition, and further protecting the security of users' electronic accounts.

BRIEF DESCRIPTION OF THE DRAWINGS

The accompanying drawings, which are incorporated in and constitute a part of this specification, illustrate embodiments and, together with the description, serve to explain the principles of the specification.

DETAILED DESCRIPTION

Embodiments of the specification will be described below with reference to the accompanying drawings. The described embodiments are merely examples, rather than all embodiments consistent with the specification. All other embodiments obtained by those of ordinary skill in the art based on the described embodiments shall fall within the scope of protection of the present application.

The embodiments of the specification provide a method for resource transfer. In the method, based on a front face image and a side face image of a target user, a liveness detection and an identity recognition on the target user are performed before executing resource transfer. By combining the front face image with the side face image, the accuracy of the identity recognition is improved. Moreover, the occurrence of fraud by using non-live images, such as photos, images displayed on a mobile phone screen, photos printed on paper and the like, can be prevented through the liveness detection, thereby improving the security of users' account numbers. Furthermore, resource transfer can be carried out without entering a password by a user, thereby avoiding a situation that resource transfer cannot be carried out because the user forgets the password.

The method for resource transfer provided in the embodiments may be applied to a server side, for example, an execution entity of the method is a server. The resource mentioned in the embodiments of the specification may be money, virtual currency, credits, etc. Accordingly, the resource transfer may be a payment operation, a virtual currency payment operation, a credits exchange operation, or the like.

Figure 1:
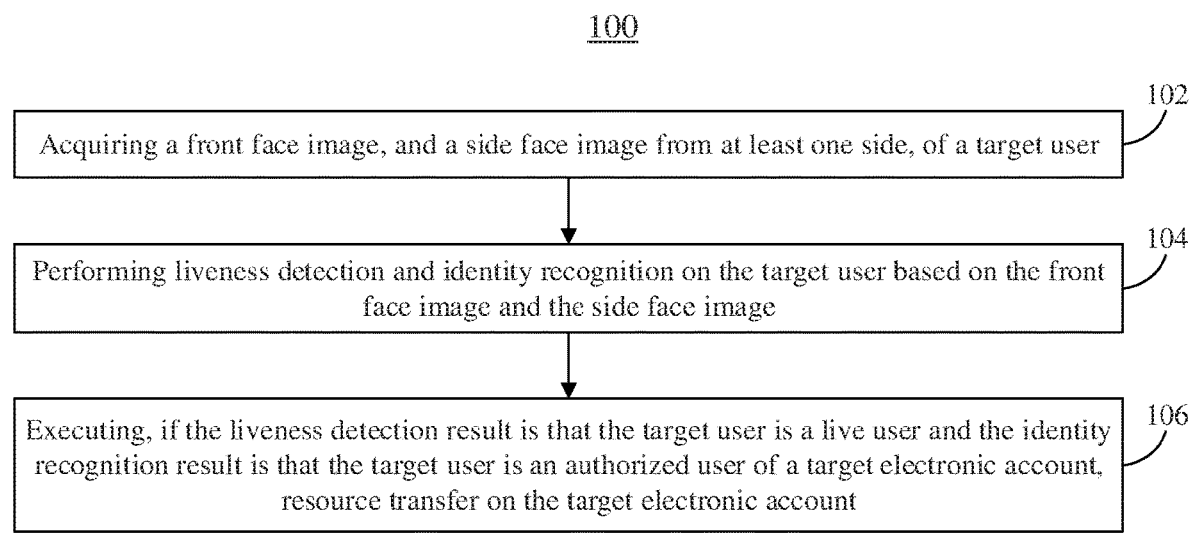
FIG. 1 is a flowchart of a method for resource transfer according to an embodiment.

FIG. 1 is a flowchart of a method 100 for resource transfer according to an embodiment. The method 100 includes the following steps.

In step 102, a front face image, and a side face image from at least one side, of a target user are acquired.

The side face image from at least one side may be a side face image from any one side or side face images from two sides, and therefore, the step 102 may include the following: three situations: acquiring the front face image and a side face image of a left side of the target user; acquiring the front face image and a side face image of a right side of the target user; and acquiring the front face image, the side face image of the left side, and the side face image of the right side of the target user.

Figure 2A:
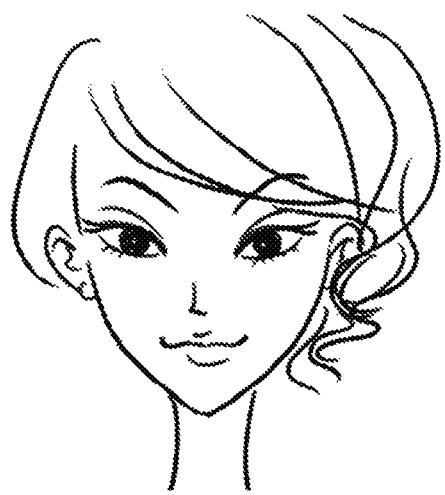
FIG. 2(a) is a schematic diagram of a captured front face image of a target user according to an embodiment.
Figure 2B:
FIG. 2(b) is a schematic diagram of a captured side face image of the target user according to an embodiment.

The front face image may be an image photographed right in front of the target user and includes the entire face of the target user. A front face image 200 is shown in FIG. 2(a) as an example. The side face image may be an image photographed from one side of the target user and generally does not include the entire face of the target user. A side face image 210 is shown in FIG. 2(b) as an example.

In step 102, the front face image and the side face image of the target user may be acquired from a client terminal device. In an embodiment, the front face image, and the side face image from at least one side, of the target user may be captured by the client terminal device and sent to a server.

The client terminal device may be a terminal device, such as a mobile phone or a tablet computer, or may be a vending machine, or the like. The client terminal device may capture the front face image and the side face image of the target user simultaneously or successively in a sequential order. If the client terminal device captures the front face image and the side face image of the target user successively in a sequential order, the client terminal device may first capture the front face image of the target user, and then capture the side face image of the target user; or may first capture the side face image of the target user, and then capture the front face image of the target user.

The process of capturing the front face image and the side face image is illustrated below by taking the resource transfer being a payment operation as an example.

In an embodiment, a vending machine may be provided with a front face image capturing device and at least one side face image capturing device. In this embodiment, when a user purchases goods and intends to make a payment through the vending machine, the user can put his/her face in a specific region under the guidance of the vending machine, thereby completing capturing of the front face image and the side face image.

In an embodiment, the vending machine may also be provided with merely one image capturing device. In this embodiment, when the user purchases goods and intends to make a payment through the vending machine, the user can put his/her face in a first specific region under the guidance of the vending machine to capture the front face image. After completing capturing of the front face image, the user puts his/her face in a second specific region under the guidance of the vending machine to capture the side face image.

In an embodiment, when the user is to make a payment using a terminal device, such as a mobile phone or a tablet computer, the user may also first capture the front face image and then capture the side face image as prompted by the terminal device.

Referring back to FIG. 1, in step 104, a liveness detection and an identity recognition on the target user based on the front face image and the side face image are performed.

In the embodiments of the specification, the liveness detection is performed to prevent occurrence of a situation that a target electronic account is stolen by outputting an image of the target user, which is acquired by other users, to a carrier (such as a photo, a mobile phone screen, paper printing, or a gum mask) to generate a non-live representation of a user for identity recognition. The identity recognition is performed to authenticate whether the target user is an authorized user of the target electronic account.

In an embodiment, the liveness detection and the identity recognition may be performed simultaneously. In an embodiment, the liveness detection may be performed first, and after the liveness detection result indicates that the target user is a live user, the identity recognition is performed. In an embodiment, the identity recognition may be performed first, and when the identity recognition result indicates that the target user is an authorized user of the target electronic account, the liveness detection is performed.

In the embodiments of the specification, if the liveness detection and the identity recognition are performed simultaneously, then the time consumption of resource transfer may be shortened, resulting in better user experience. On the other hand, if the two processes are performed in a sequential order, resource transfer failure may be determined if the target user being not a live user or the target user being not an authorized user of the target electronic account is first identified, and it is not necessary to further execute subsequent steps, thereby reducing workload of the server.

In step 106, if the liveness detection result is that the target user is a live user and the identity recognition result is that the target user is an authorized user of a target electronic account, resource transfer on the target electronic account is executed.

For example, the executing resource transfer on the target electronic account may be executing money deducting operations, credits deducting operations, or the like on the target electronic account.

In an embodiment, in step 104, the liveness detection is performed first and then the identity recognition is performed. For example, the liveness detection and the identity recognition on the target user are performed based on the front face image and the side face image, and step 104 may include step (1) and step (2):

Step (1): performing the liveness detection on the target user based on the front face image and the side face image.

Step (2): if the liveness detection result is that be target user is a live user, identifying whether the target user is an authorized user of a target electronic account based on the front face image and the side face image.

The authorized user of the target electronic account may be a target electronic account holder, or other users authorized by the target electronic account holder to use the target electronic account.

In the embodiments of the specification, performing the liveness detection on the target user in the above step (1) may include approach I and approach II:

In approach I, performing the liveness detection on the target user based on the front face image and the side face image may include step I and step II.

Step I: inputting the front face image into a pre-trained first liveness detection model for processing to acquire a first probability outputted from the first liveness detection model; and inputting the side face image into a pre-trained second liveness detection model for processing to acquire a second probability outputted from the second liveness detection model. The first probability and the second probability are each a probability that the target user is a live user; or the first probability and the second probability are each a probability that the target user is a non-live representation of a user.

Step II: identifying whether the target user is a live user based on the first probability and the second probability. The first liveness detection model and the second liveness detection model may be same models. In an embodiment, in order to shorten the time consumption of the liveness detection and improve the efficiency of the liveness detection, the front face image and the side face image are inputted into two liveness detection models respectively, whilst performing liveness detection on the target user based on the front face image and the side face image simultaneously.

In some embodiments, a liveness detection model may be pre-trained, the front face image may be first inputted into the liveness detection model for processing to acquire a first probability outputted from the liveness detection model, and then the side face image may be inputted into the liveness detection model for processing to acquire a second probability outputted from the liveness detection model.

In some embodiments, if the side face image of the left side and the side face image of the right side of the target user are captured simultaneously, then three liveness detection models may be pre-trained, the front face image is inputted into a first one of the liveness detection models for processing, the side face image of the left side is inputted into a second one of the liveness detection models for processing, and the side face image of the right side is inputted into a third one of the liveness detection models for processing, to obtain three probabilities.

In an embodiment, a process of inputting the front face image into the first liveness detection model for processing may be the same as a process of inputting the side face image into the second liveness detection model for processing. A specific process of obtaining the first probability from the first liveness detection model will be introduced below by taking inputting the front face image into the first liveness detection model as an example.

In an embodiment, the first liveness detection model and the second liveness detection model may each be a Convolutional Neural Network (CNN) model. In the embodiments of the specification, a CNN binary classification model may be employed. The CNN binary classification model may be trained by pre-collecting a face image sample of a live user and a face image sample of a non-live representation of a user, and annotating the face image sample of the live user and the face image sample of the non-live: representation of a user, respectively.

After inputting the front face image of the target user into CNN, convolution processing is performed on the front face image using a pre-trained convolutional kernel, a sum of a value obtained by convolution and an offset parameter is inputted into an activation function, and an output of the activation function is used as a value of a node in a next layer. The convolution processing is continued in the next layer, a sum of a value obtained by convolution and the offset parameter is inputted into the activation function to obtain an output value of the activation function until the last layer, and the output value of the activation function is used as the first probability.

The output value of the activation function may be the probability that the target user is a live user, or the probability that the target user is a non-live representation of a user, and may be set based on an actual application scenario.

Identifying whether the target user is a live user based on the first probability and the second probability in the above step II may include the following processes: performing a fusion calculation on the first probability and the second probability to obtain a fusion result corresponding to the first probability and the second probability; and identifying whether the target user is a live user based on the fusion result and a set probability threshold.

In the embodiments of the specification, the first probability is denoted as $P_1$, the second probability is denoted as $P_2$, and a fusion calculation may be performed on the first probability and the second probability based on the following formula.

$$P = W_1 * P_1 W_2 * P_2$$

where $W_1$ is a weight coefficient corresponding to the first probability, $W_2$ is a weight coefficient corresponding to the second probability, and P is the fusion result of the first probability and the second probability.

If the first probability and the second probability are each the probability that the target user is a live user, after calculating the fusion result of the first probability and the second probability, the fusion result may be compared with the set probability threshold. If the fusion result is greater than or equal to the set probability threshold, then the target user can be determined as a live user. On the other hand, if the fusion result is less than the set probability threshold, then the target user can be determined as a non-live representation of a user.

If the first probability and the second probability are each the probability that the target user is a non-live representation of a user, then after calculating the fusion result of the first probability and the second probability, the fusion result may be compared with the set probability threshold. If the fusion result is greater than or equal to the set probability threshold, then the target user can be determined as a non-live representation of a user. On the other hand, if the fusion result is less than the set probability threshold, then the target user can be determined as a live user.

In an embodiment, the value of the set probability threshold when the first probability and the second probability are each the probability that the target user is a live user, and the value of the set probability threshold when the first probability and the second probability are each the probability that the target user is a non-live representation of a user may be identical or different. For example, the values of the set probability threshold may be set based on an actual application scenario. This is not limited in the embodiments of the specification.

Figure 3A:
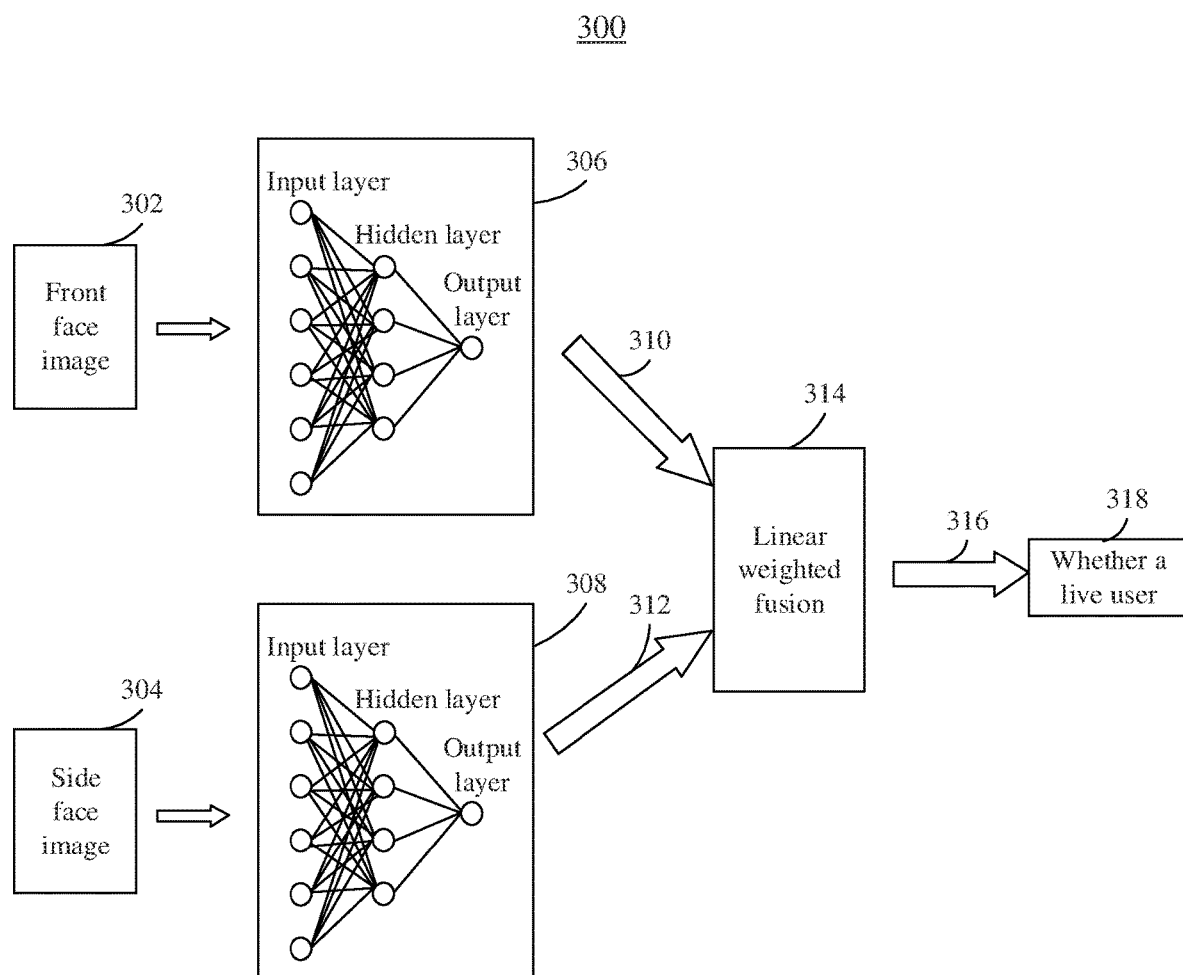
FIG. 3(a) is a flowchart of a method of performing a liveness detection on a target user according to an embodiment.

FIG. 3(a) is a flowchart of a method 300 for identifying whether the target user is a live user, according to an embodiment. Referring to FIG. 3(a), in the method 300, a first liveness detection model and a second liveness detection model are each a CNN model, the first liveness detection model uses a CNN model 306, and the second liveness detection model uses a CNN model 308. A front face image 302 of the target user may be inputted into the CNN model 306, and the CNN model 306 processes the front face image 302. A side face image 304 of the target user may be inputted into the CNN model 308, and the CNN model 308 processes the side face image 304. The first probability that the target user is a non-live representation of a user is acquired from the CNN model 306 (step 310), and the second probability that the target user is a non-live representation of a user is acquired from the CNN model 308 (step 312). A fusion calculation is performed on the first probability and the second probability (step 314), and the fusion result is compared with the set probability threshold (step 316). If the fusion result is greater than or equal to the set probability threshold, then the target user is considered as a non-live representation of a user, and if the fusion result is less than the set probability threshold, then the target user is considered as a live user (step 318).

In an embodiment, when the service is in a stage of just coming online, whether the target user is a live user can be identified by this approach. In the above approach I, there are low requirements for training sample data during model training, and an initial model can be fast trained, thereby helping the service to quickly live through a start stage after coming online.

In approach II, performing the liveness detection on the target user based on the front face image and the side face image may include: inputting the front face image and the side face image into a pre-trained third liveness detection model for processing to acquire a third probability outputted from the third liveness detection model; where the third probability is a probability that the target user is a live user, or the third probability is a probability that the target user is a non-live representation of a user; and identifying whether the target user is a live user based on the third probability and the set probability threshold.

In this approach, the front face image and the side face image are inputted into the same liveness detection model for processing. For example, after the front face image and the side face image are inputted into the liveness detection model, the third probability is obtained by first preprocessing the front face image and the side face image, and then processing the preprocessed images.

Figure 3B:
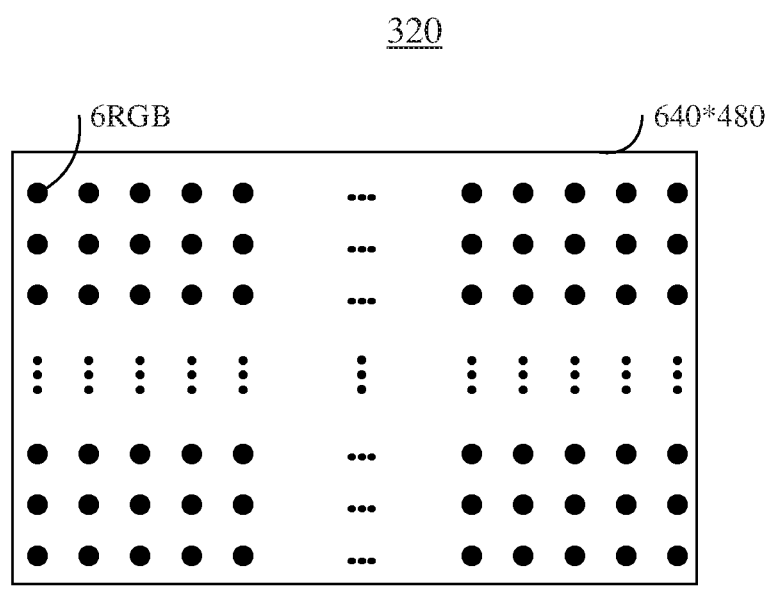
FIG. 3(b) is a schematic diagram of a combined front face image and side face image according to an embodiment.
Figure 3C:
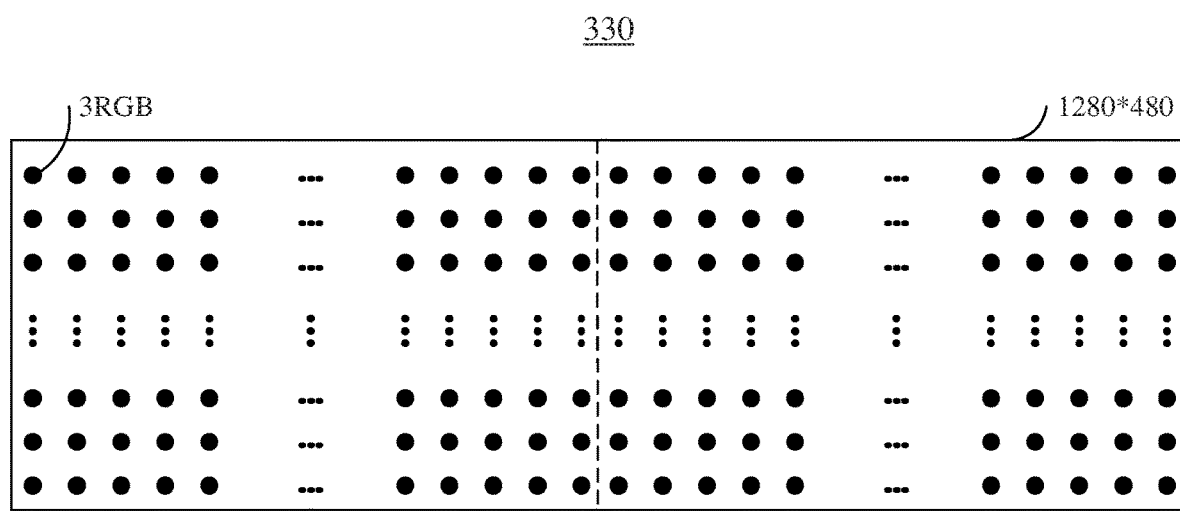
FIG. 3(c) is a schematic diagram of a combined front face image and side face image according to an embodiment.
Figure 3D:
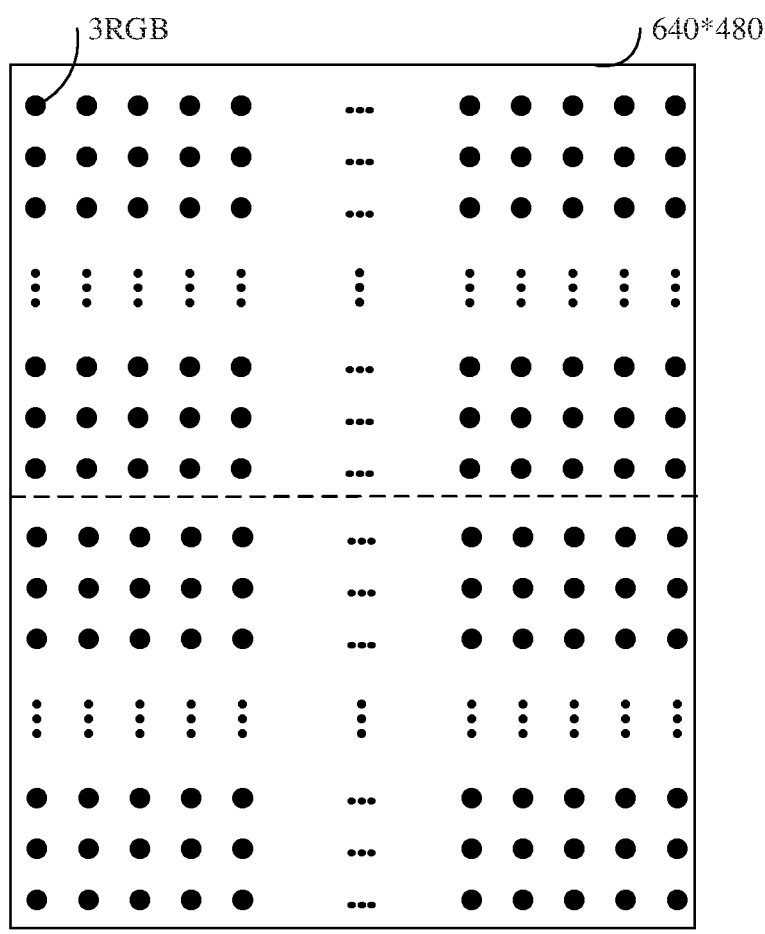
FIG. 3(d) is a schematic diagram of a combined front face image and side face image according to an embodiment.

FIGS. 3(b)-3(d) are schematic diagrams of combined front face images and side face images according to some embodiments. In an embodiment, preprocessing the front face image and the side face image may be fusion processing of the front face image and the side face image, for example, fusing the front face image and the side face image into one image. In an embodiment, a size of the front face image is 640×480×3RGB, a size of the side face image is also 640×480×3RGB, and a fused image 320 is 640×480×6RGB, as shown in FIG. 3(b). In an embodiment, the front face image and the side face image may also be laterally spliced, and a spliced image 330 is 1280×480×3RGB, as shown in FIG. 3(c). In an embodiment, the front face image and the side face image may also be longitudinally spliced, and a spliced image 340 is 640×960×3RGB, as shown in FIG.

3(d). In the embodiments, 640 represents a number of row pixels in the image, 480 represents a number of column pixels in the image, and the RGB represents an R value, a G value, and a B value corresponding to each pixel. R represents red, G represents green, and B represents blue.

In the embodiments, "3" in the 640×480×3RGB represents a total of three values, i.e., an R value, a B value, and a G value corresponding to each pixel point in the image; and "6" in the 640×480×6RGB represents a total of six values, two R values, two B values, and two G values corresponding to each pixel point in the image.

The above description is merely illustrative and does not constitute a limitation to sizes of the front face image and the side face image in the embodiments of the specification.

In an embodiment, after preprocessing the front face image and the side face image, a process of processing the preprocessed image may be the same as the process of processing the front face image or processing the side face image in the above approach I. Reference can be made to the above approach I for details, which will not be repeated here.

In an embodiment, identifying whether the target user is a live user based on the third probability and the set probability threshold may be the same as identifying whether the target user is a live user based on the fusion result and the set probability threshold in the approach I. Reference can be made to the details in approach I, which will not be repeated here.

Figure 3E:
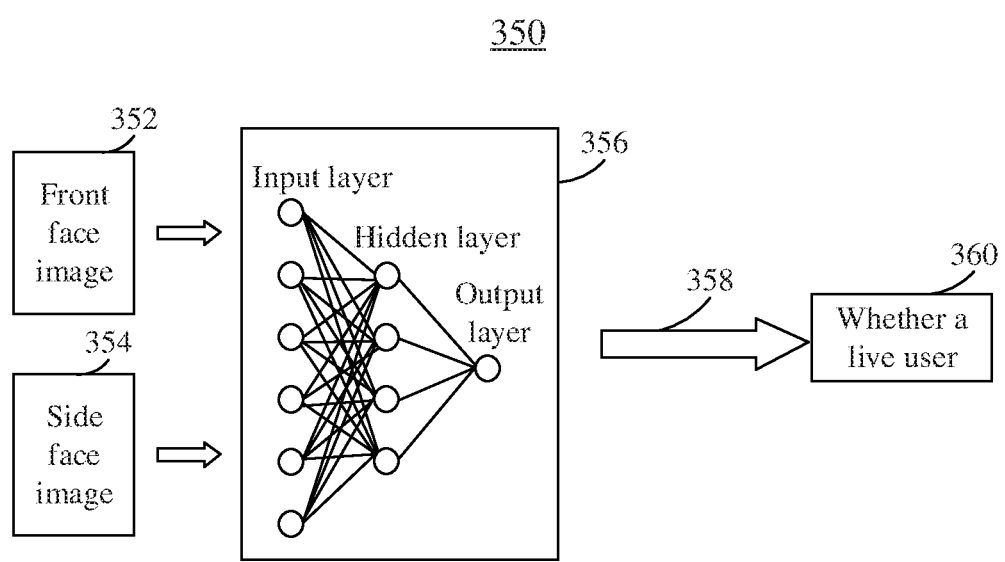
FIG. 3(e) is a flowchart of a method of performing liveness detection on a target user according to an embodiment.

FIG. 3(e) is a flowchart of a method 350 for identifying whether the target user is a live user by the above described approach II, according to an embodiment. Referring to FIG. 3(e), in the method 350, a CNN model 356 is used as a third liveness detection model. After inputting a front face image 352 and a side face image 354 of a target user into the CNN model 356, a fused image is obtained by fusion processing of the front face image 352 and the side face image 354, and then the fused image is processed to output the third probability that the target user is a non-live representation of a user. The third probability is compared with the set probability threshold (step 358). If the third probability is greater than or equal to the set probability threshold, then the target user is considered as a non-live representation of a user (step 360). On the other hand, if the fusion result is less than be set probability threshold, then the target user is considered as a live user (step 360).

In an embodiment, a relatively high amount of training sample data needs to be collected during the model training in approach II, for example, there are high requirements for the training sample data. Therefore, this approach may be adopted after the service comes on-line for a period of time.

In an embodiment, after the service comes on-line for a period of time, there is not only the liveness detection model in approach I, but also the liveness detection model in approach II. In this case, the fusion result obtained in approach I is re-fused with the third probability obtained in approach II (linearly weighted), and whether the target user is a live user is determined based on the final fusion result.

In an embodiment, in the above step (2), performing the identity recognition on the target user based on the front face image and the side face image includes step (A) and step (B) as follows.

Step (A): performing a similarity comparison between the front face image and a recorded front face image corresponding to the target electronic account; and performing a similarity comparison between the side face image and a recorded side face image corresponding to the target electronic account.

Step (B): performing an identity recognition on the target user based on a front face similarity and a side face similarity. For example, performing the identity recognition on the target user based on a front face similarity and a side face similarity in step (B) may include: determining the target user as an authorized user of the target electronic account if the front face similarity is greater than a first set threshold and the side face similarity is greater than a second set threshold.

The first set threshold and the second set threshold are similarities that are set based on an actual application scenario. For example, a value of the first set threshold may be 95%, a value of the second set threshold may be 90%, and the like. The description here is merely illustrative and does not limit specific values of the first set threshold and the second set threshold. The embodiments of the specification do not limit the values of the first set threshold and the second set threshold. The values of the first set threshold and the second set threshold can be set based on an actual application scenario. In addition, the value of the first set threshold may be equal to, or different from, the value of the second set threshold.

In the embodiments of the specification, after performing a similarity comparison on the front face image and the recorded front face image, and performing a similarity comparison on the side face image and the recorded side face image, the front face similarity is compared with the first set threshold, and the side face similarity is compared with the second set threshold. If the front face similarity is greater than the first set threshold, and the side face similarity is greater than the second set threshold, then the target user identification is considered successful, for example, the target user can be determined as an authorized user of the target electronic account.

In another embodiment, linear weighting on the front face similarity and the side face similarity can also be calculated, for example, calculating a first product of the front face similarity and a weight coefficient of the front face similarity, calculating a second product of the side face similarity and a weight coefficient of the side face similarity, then calculating a sum of the first product and the second product, comparing the sum with a set threshold, determining the target user as an authorized user of the target electronic account if the sum is greater than or equal to the set threshold, and determining the target user as not an authorized user of the target electronic account if the sum is less than the set threshold.

In an embodiment, performing the similarity comparison between the front face image and a recorded front face image corresponding to the target electronic account in the above step (A) may be implemented through the following processes.

Key points on the front face image are detected using a pre-trained key point detection model, where the key points may be both eyes, a nose tip, lips, eyebrows, and the like of the target user. After detecting the key points on the front face image, the front face image is calibrated based on positions of the key points. For example, the original face may be biased and in a posture different from a facial posture on a pre-stored recorded front face image. The facial posture on the front face image may be adjusted by affine transformation based on these key points, or the front face image may also be zoomed, stretched, rotated, and the like, so that the adjusted front face image has the same size as the recorded front face image, and has a facial posture consistent with the facial posture in the recorded front face image.

Then, a convolution operation is performed on the adjusted front face image through the convolutional neural network to calculate a first front face feature vector of the target user. In addition, if a database directly stores a second front face feature vector corresponding to the recorded front face image, then the second front face feature vector corresponding to the target electronic account is acquired directly front the database. If the database only stores the recorded front face image, then the convolution operation is performed on the recorded front face image through the convolutional neural network to obtain the second front face feature vector corresponding to the target electronic account.

Finally, a Euclidean distance between the first front face feature vector and the second front face feature vector is calculated. The Euclidean distance is determined as a similarity between the front face image and the recorded front face image of the target user. For example, traditional methods for calculating a Euclidean distance between two vectors may be used.

In an embodiment, performing the similarity comparison between the side face image and a recorded side face image corresponding to the target electronic account in the above step (A) may be implemented through step (A1), step (A2), and step (A3) as follows:

Step (A1): standardizing the side face image to obtain a standard side face image; where a size of the standard side face image is a set size, and a side face posture in the standard side face image is a set posture.

Step (A2): extracting a first side face feature vector of the target user based on the standard side face image; and acquiring a second side face feature vector corresponding to the recorded side face image.

Step (A3): calculating a similarity between the side face image and the recorded side face image based on the first side face feature vector and the second side face feature vector.

In an embodiment, the step (A1) may be performed by: determining positions of key points on the side face image; where the key points include: an ear hole center and a nose tip; and adjusting the side face image based on a position of the ear hole center on the side face image, a position of the nose tip on the side face image, and relative positions of the ear hole center and the nose tip to obtain the standard side face image.

Prior to executing the method provided in the embodiments of the specification, a large number of side face images of users may be captured, and then the key points on the side face images are manually annotated. Side face images annotated with the key points are used as training samples, and then a key point detection model is obtained by training using the Convolutional Neural Network (CNN).

In an embodiment, feature vectors of the key points may be trained through the convolutional neural network to obtain the key point detection model. During key points detection, feature vectors of areas on the side face image can be matched with the feature vectors of the above key points to determine the positions of the key points on the side face image.

In an embodiment, the key point detection model training and the key point detection of the side face image may be the same as those of the front face image, except for the key point selection, which is different. Accordingly, the key points on the side face image may be detected using the key point detection model obtained by training, and the key points are annotated on the side face image.

Figure 4A:
FIG. 4(a) is a schematic diagram of key points on a side face image according to an embodiment.

FIG. 4(a) is a schematic diagram of key points on a side face image according to an embodiment. Referring to FIG. 4(a), for example, the key points selected on a side face image 400 may be an ear hole center 410, a midpoint between eyebrows 412, a nose tip 414, a chin tip 416, and a jawbone joint 418. The selected key points on the side face image may also be other key points, and FIG. 4(a) is merely an illustrative example.

After determining the positions of the key points on the side face image, the side face image may be calibrated by using any two or more key points thereof.

A specific process of adjusting the side face image to obtain a standard side face image will be described below by taking adjusting the side face image based on two key points (the ear hole center and the nose tip) as an example.

Figure 4B:
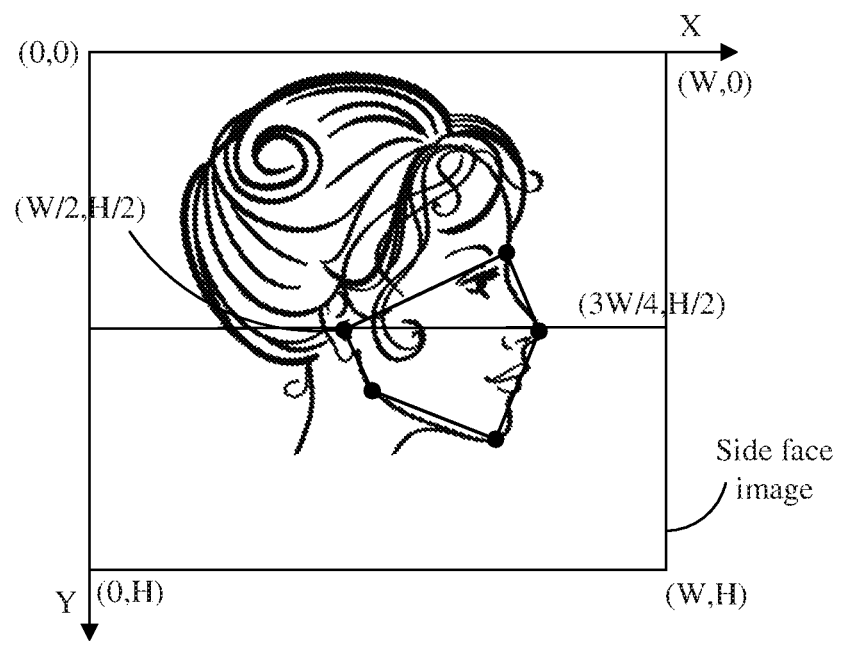
FIG. 4(b) is a schematic diagram of a standard e face image after conversion according to an embodiment.

First, as shown in FIG. 4(b), a coordinate system may be established with a top left corner of the side face image as the origin (0,0), a horizontal side edge as the horizontal axis X, and a vertical side face as the longitudinal axis Y, and the side face image is compressed, stretched, cut, or otherwise processed so that coordinates of the ear hole center in the coordinate system are (W/2, H/2), that is, causing the ear hole center to be at a center point of the side face image, where W represents a length of the side face image, and H represents a height of the side face image. Then, the side face image begins to rotate with the ear hole center as the center point, until a connection line between the ear hole center and the nose tip is parallel to the horizontal axis X in the coordinate system. Finally, the side face image is compressed or stretched again, so that coordinates of the nose tip in the coordinate system are (3W/4, H/2). A standard side face image 410 obtained after the adjustment is shown in FIG. 4(b).

The above description merely shows an example of standardizing the side face image. The side face image may also be standardized using other key points. The above standard side face image is not limited to a particular form, and may also be in other forms.

The purpose of standardizing the side face image is to keep the size of and a facial posture in the side face image consistent with the size of and the facial posture in the recorded side face image. For example, in the embodiments, the recorded side face image s stored in a form of the standard side face image. In an embodiment, when performing the similarity comparison on the side face image, the side face image is adjusted to have the same size and posture as the recorded side face image, in order to improve the accuracy of the side face similarity comparison.

In step (A2), after obtaining the standard side face image, the side face image is processed, and a convolution operation is performed on the standard side face image through the convolutional neural network to obtain the first side face feature vector of the side face image.

In the embodiments, the database may only pre-store the recorded side face image corresponding to the authorized user of the target electronic account. The recorded side face image is stored in the form of the standard side face image. Therefore, in step (A2), a convolution operation may be performed on the recorded side face image through the convolutional neural network to extract the second side face feature vector. The second side face feature vector corresponding to the recorded side face image may also be acquired in advance, and the second side face feature vector and the recorded side face image are stored together in the database in this case, in step (A2), it is only necessary to acquire the second side face feature vector from the database.

In an embodiment, calculating a similarity between the side face image and the recorded side face image based on the first side face feature vector and the second side face feature vector in the above step (A3) includes: calculating a Euclidean distance between the first side face feature vector and the second side face feature vector; and determining the Euclidean distance as a similarity between the side face image and the recorded side face image. The details of calculating the Euclidean distance between two vectors is omitted here.

Figure 5:
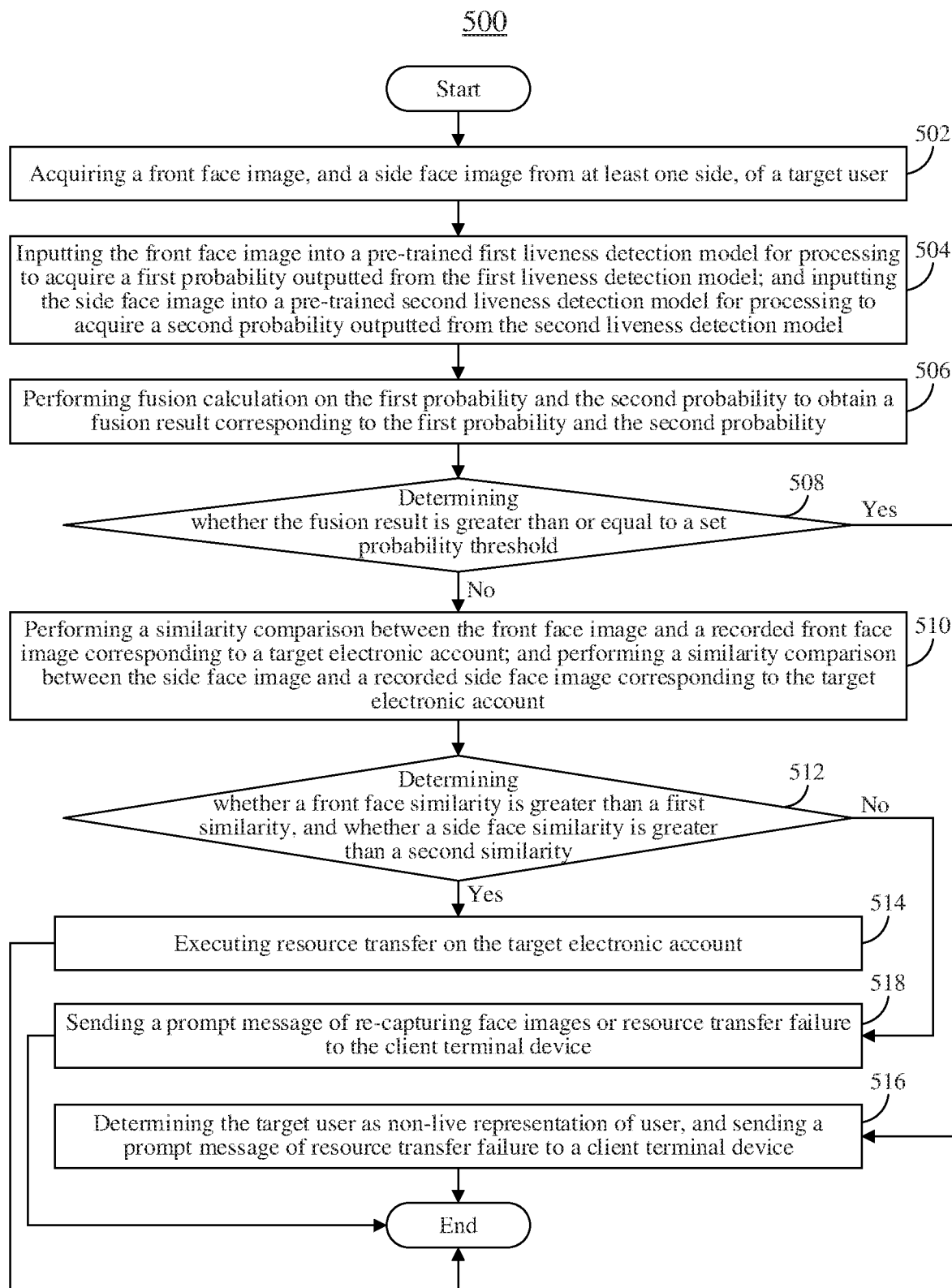
FIG. 5 is a flowchart of a method for resource transfer according to an embodiment.

FIG. 5 is a flowchart of a method 500 for resource transfer according an embodiment. An executing entity of the method 500 may be a server side. Referring to FIG. 5, the method 500 includes the following steps:

Step 502: acquiring a front face image, and a side face image from at least one side, of a target user. In the embodiment, the front face image and the side face image of the target user may be captured by a client terminal device. Therefore, the server acquires the front face image and the side face image of the target user from the client terminal device.

Step 504: inputting the front face image into a pre-trained first liveness detection model for processing to acquire a first probability outputted from the first liveness detection model; and inputting the side face image into a pre-trained second liveness detection model for processing to acquire a second probability outputted from the second liveness detection model.

The first probability and the second probability may be a probability that the target user is a live user; or a probability that the target user is a non-live representation of a user. In the embodiment corresponding to FIG. 5, the description is provided by taking the first probability and the second probability being a probability that the target user is a non-live representation of a user as an example.

Step 506: performing a fusion calculation n the first probability and the second probability to obtain a fusion result corresponding to the first probability and the second probability.

Step 508: determining whether the fusion result is greater than or equal to a set probability threshold; and executing step 516 if the fusion result is greater than or equal to the set probability threshold; otherwise, executing step 510.

Step 510: performing a similarity comparison between the front face image and a recorded front face image corresponding to a target electronic account; and performing a similarity comparison between the side face image and a recorded side face image corresponding to the target electronic account.

Step 512: determining whether the front face similarity is greater than a first similarity, and whether the side face similarity is greater than a second similarity; and executing step 514 if the front face similarity is greater than the first similarity, and the side face similarity is greater than the second similarity; otherwise, executing step 518.

Step 514: executing resource transfer on the target electronic account.

Step 516: determining the target user as a non-live representation of a user, and sending a prompt message of resource transfer failure to a client terminal device.

Step 518: sending a prompt message of re-capturing face images or resource transfer failure to the client terminal device.

Specific implementation processes of the steps in the embodiment corresponding to FIG. 5 may be the same as the specific implementation processes of the steps in the method corresponding to the above embodiments.

Figure 6:
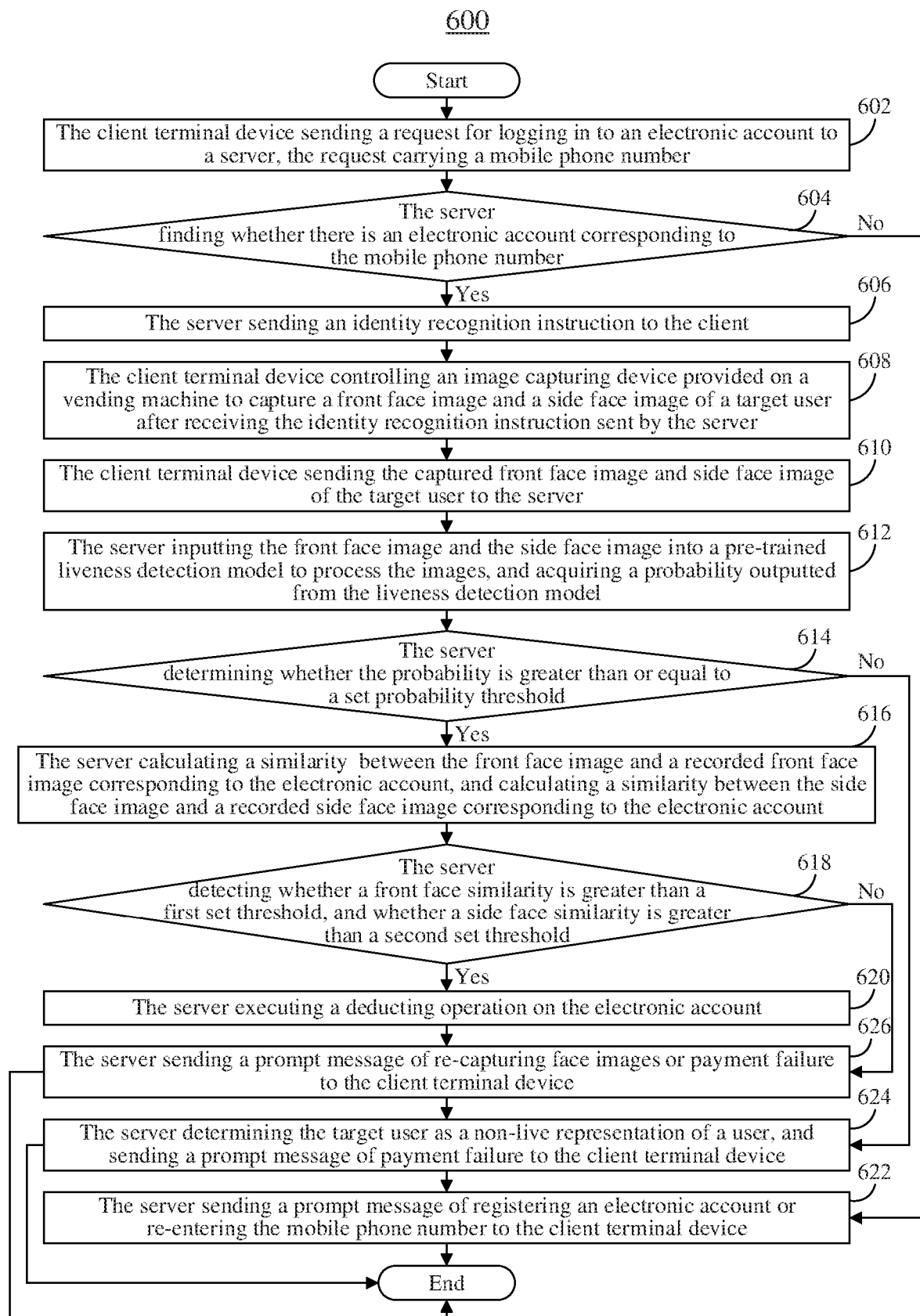
FIG. 6 is a flowchart of a method for resource transfer according to an embodiment.

FIG. 6 is a flowchart of a method 600 for resource transfer according to an embodiment. The method 600 shown in FIG. 6 takes the resource transfer being a payment as an example, and a specific application scenario is that a user is to make a payment when purchasing goods on a vending machine. The vending machine is provided with a front face image capturing device and a side face image capturing device, and is provided with a payment client terminal. Therefore, the vending machine may also become a client terminal device. Referring to FIG. 6, the method 600 includes the following steps:

Step 602: the client terminal device sends a request for logging in to an electronic account to a server, the request carrying a mobile phone number. When a user selects goods and is to make a payment through the vending machine, the user sends the request for logging in to the electronic account number to the server through the client terminal device provided on the vending machine.

Step 604: the server determines whether there is an electronic account corresponding to the mobile phone number; and executes step 606 if there is the electronic account corresponding to the mobile phone number; otherwise, executes step 622.

Step 606: the server sends an identity recognition instruction to the client terminal.

Step 608: the client terminal device controls an image capturing device provided on a vending machine to capture a front face image and a side face image of a target user after receiving identity recognition instruction sent by the server.

A front face image capturing device and a side face image capturing device are provided at corresponding positions on the vending machine, and the client terminal device controls the front face image capturing device to capture a front face image of the target user and the side face image capturing device to capture a side face image of the target user simultaneously.

Step 610: the client terminal device sends the captured front face image and side face image of the target user to the server.

Step 612: the server inputs the front face image and the side face image into a pre-trained liveness detection model to process the images, and acquires a probability outputted from the liveness detection model. The probability nay be a probability that the target user is a live user.

Step 614: the server determines whether the probability is greater than or equal to a set probability threshold; and executes step 616 if the probability is greater than or equal to the set probability threshold; otherwise, executes step 624.

Step 616: the server calculates a similarity between the front face image and a recorded front face image corresponding to the electronic account, and calculates a similarity between the side face image and a recorded side face image corresponding to the electronic account.

Step 618: the server detects whether the front face similarity is greater than a first set threshold, and whether the side face similarity is greater than a second set threshold; and executes step 620 if the front face similarity is greater than the first set threshold, and the side face similarity is greater than the second set threshold, otherwise, executes step 626.

Step 620: the server executes a deducting operation on the electronic account.

Step 622: the server sends a prompt message of registering an electronic account or re-entering the mobile phone number to the client terminal device.

Step 624: the server determines the target user as a non-live representation of a user, and sends a prompt message of payment failure to the client terminal device.

Step 626: the server sends a prompt message of re-capturing face images or payment failure to the client terminal device.

Specific implementation processes of the steps in the embodiment corresponding to FIG. 6 may be the same as the specific implementation processes of the steps in the embodiments corresponding to the above FIG. 1 to FIG. 4(*b*).

Figure 7:
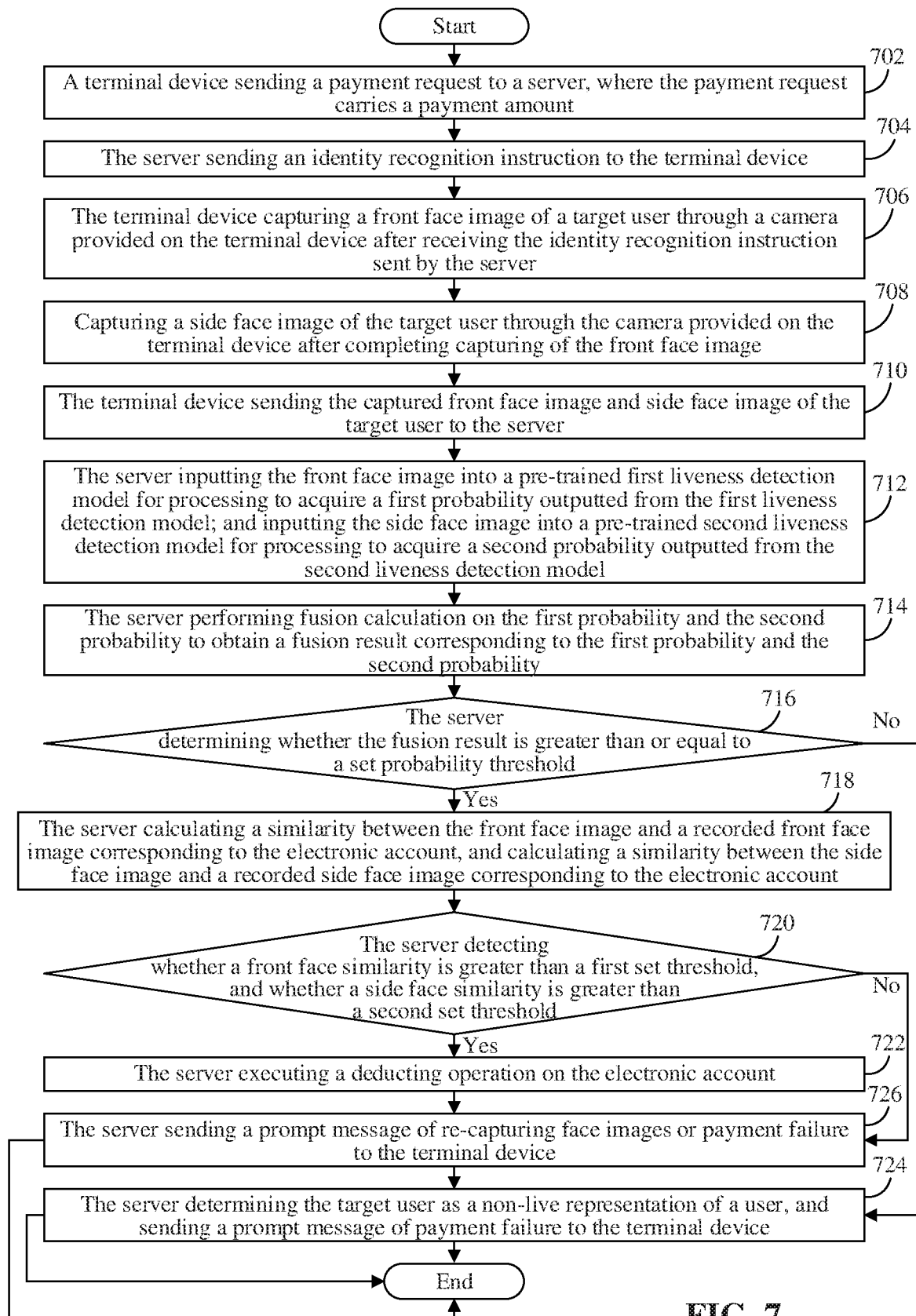
FIG. 7 is a flowchart of a method for resource transfer according to an embodiment.

FIG. 7 is a flowchart of a method 700 for resource transfer according to an embodiment. The method 700 shown in FIG. 7 takes the resource transfer being a payment as an example, and a specific application scenario is that a user is to make a payment through a terminal device, such as a mobile phone or a tablet computer. Referring to FIG. 7, the method 700 includes the following steps:

Step 702: a terminal device sends a payment request to a server, where the payment request carries a payment amount. For example, after completing shopping offline or online, a user opens a payment application program installed on the terminal device to make a payment.

Step 704: the server sends an identity recognition instruction to the terminal device.

Step 706: the terminal device captures a front face image of a target user through a camera provided on the terminal device after receiving the identity recognition instruction sent by the server. In an embodiment, in step 706, the terminal device may display a front face contour on its display screen, prompt the target user to put his/her front face within the front face contour area, and capture the front face image of the target user through the camera after the target user puts his/her front face within the above area.

Step 708: the camera provided on the terminal device captures a side face image of the target user after completing capturing of the front face image. In an embodiment, in step 708, the terminal device may display a side face contour on its display screen, prompt the target user to put his/her side face within the side face contour area, and capture the side face image of the target user through the camera after the target user puts his/her side face within the above area.

Step 710: the terminal device sends the captured front face image and side face image of the target user to the server.

Step 712: the server inputs the front face image into a pre-trained first liveness detection model for processing to acquire a first probability outputted from the first liveness detection model: and inputs the side face image into a pre-trained second liveness detection model for processing to acquire; a second probability outputted from the second liveness detection model.

The first probability and the second probability may be a probability that the target user is a live user: or a probability that the target user is a non-live representation of a user. In the embodiment corresponding to FIG. 7, the description is provided by taking the first probability and the second probability being a probability that the target user is a live user as an example.

Step 714: the server performs a fusion calculation on the first probability and the second probability to obtain a fusion result corresponding to the first probability and the second probability.

Step 716: the server determines whether the fusion result is greater than or equal to a set probability threshold; and executes step 718 if the fusion result is greater than or equal to the set probability threshold; otherwise, executes step 724.

Step 718: the server calculates a similarity between the front face image and a recorded front face image corresponding to the electronic account, and calculates a similarity between the side face image and a recorded side face image corresponding to the electronic account.

Step 720: the server detects whether the front face similarity is greater than a first set threshold, and whether the side face similarity is greater than a second set threshold; and executes step 722 if the front face similarity is greater than the first set threshold, and the side face similarity is mater than the second set threshold, otherwise, executes step 726.

Step 722: the server executes a deducting operation on the electronic account.

Step 724: the server determines the target user as a non-live representation of a user, and sends a prompt message of payment failure to the terminal device.

Step 726: the server sends a prompt message of re-capturing face images or payment failure to the terminal device.

Specific implementation processes of the steps in the embodiment corresponding to FIG. 7 may be the same as the specific implementation processes of the steps in the embodiments corresponding to the above FIG. 1 to FIG. 4(*b*).

In the methods for resource transfer provided in the embodiments of the specification, whether a target user is an authorized user of a target electronic account may be verified by an identity recognition based on a front face image and a side face image of the target user during resource transfer, and resource transfer can be carried out without entering a password by a user, thereby avoiding a situation that resource transfer cannot be carried out because the user forgets the password. In addition, whether the target user is a live user may be verified by an liveness detection based on the front face image and the side face image, avoiding the problem of security risks in electronic accounts caused by face images of users being acquired by others, thereby improving the security of the electronic accounts. Moreover, more feature information is added by combining the front face image and the side face image during the liveness detection and the identity recognition, thereby improving the accuracy of the liveness detection and the identity recognition, and further protecting the security of users' electronic accounts.

Figure 8:
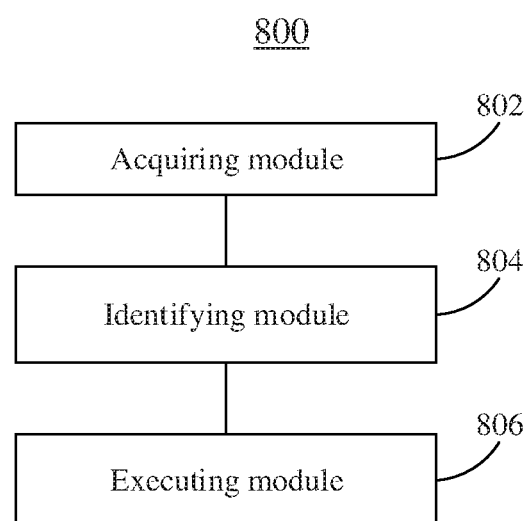
FIG. 8 is a schematic diagram of an apparatus for resource transfer according to an embodiment.

The embodiments of the specification further provide an apparatus for resource transfer configured to execute the methods for resource transfer provided in the embodiments. The apparatus for resource transfer may be applied to a server side. FIG. 8 is a schematic diagram of an apparatus 800 for resource transfer provided in an embodiment. Referring to FIG. 8, the apparatus 800 includes: an acquisition module 802 configured to acquire a front face image, and a side face image from at least one side, of a target user; an identification module 804 configured to perform a liveness detection and an identity recognition on the target user based on the front face image and the side face image; and an execution module 806 configured to execute, if the liveness detection result is that the target user is a live user and the identity recognition result is that the target user is an authorized user of a target electronic account, resource transfer on the target electronic account.

In an embodiment, the identification module 804 includes: a first identification unit configured to perform a liveness detection on the target user based on the front face image and the side face image; and a second identification unit configured to perform an identity recognition on the target user based on the front face image and the side face image if the liveness detection result is that the target user is a live user.

In an embodiment, the first identification unit is configured to: input the front face image into a pre-trained first liveness detection model for processing to acquire a first probability outputted from the first liveness detection model; and input the side face image into a pre-trained second liveness detection model for processing to acquire a second probability outputted from the second liveness detection model; where the first probability and the second probability are each a probability that the target user is a live user; or the first probability and the second probability are each a probability that the target user is a non-live representation of a user; and identify whether the target user is a live user based on the first probability and the second probability.

In an embodiment, the first identification unit is further configured to: perform a fusion calculation on the first probability and the second probability to obtain a fusion result corresponding to the first probability and the second probability; and identify whether the target user is a live user based on the fusion result and a set probability threshold.

In an embodiment, the first identification unit is further configured to: input the front face image and the side face image into a pre-trained third liveness detection model for processing to acquire a third probability outputted from the third liveness detection model; where the third probability is a probability that the target user is a live user, or the third probability is a probability that the target user is a non-live representation of a user; and identify whether the target user is a live user based on the third probability and the set probability threshold.

In an embodiment, the second identification unit is configured to: perform a similarity comparison between the front face image and a recorded front face image corresponding to the target electronic account; perform a similarity comparison between the side face image and a recorded side face image corresponding to the target electronic account; and perform an identity recognition on the target user based on a front face similarity and a side face similarity.

In an embodiment, the second identification unit is further configured to: standardize the side face image to obtain a standard side face image; where a size of the standard side face image is a set size, and a side face posture in the standard side face image is a set posture; extract a first side face feature vector of the target user based on the standard side face image; and acquire a second side face feature vector corresponding to the recorded side face image; and calculate a similarity between the side face image and the recorded side face image based on the first side face feature vector and the second side face feature vector.

In an embodiment, the second identification unit is further configured to: determine the target user as an authorized user of the target electronic account if the front face similarity is greater than a first set threshold and the side face similarity is greater than a second set threshold.

Specific implementation of the functions corresponding to the modules and units in the embodiments may be the same as the methods illustrated in FIG. 1 to FIG. 7. Therefore, the details of the specific implementation will not be repeated here.

In the apparatus for resource transfer provided in the embodiments, whether a target user is an authorized user of a target electronic account is verified by an identity recognition based on a front face image and a side face image of the target user during resource transfer, and resource transfer can be carried out without entering a password by a user, thereby avoiding a situation that resource transfer cannot be carried out because the user forgets the password. In addition, whether the target user is a live user is verified by a liveness detection based on the front face image and the side face image, avoiding the problem of security risks in electronic accounts caused by face images of users being acquired by others, thereby improving the security of the electronic accounts. Moreover, more feature information is added by combining the front face image and the side face image during the liveness detection and the identity recognition, thereby improving the accuracy of the liveness detection and the identity recognition, and further protecting the security of users' electronic accounts.

Figure 9:
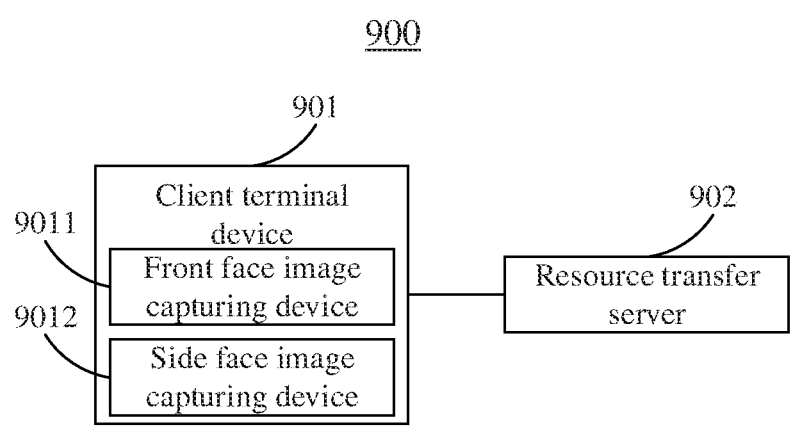
FIG. 9 is a schematic diagram of a system for resource transfer according to an embodiment.

The embodiments of the specification further provide a system for resource transfer. FIG. 9 is a schematic diagram of a system 900 for resource transfer according to an embodiment. Referring to FIG. 9, the system 900 includes: a client terminal device 901 and a resource transfer server 902. The client terminal device 901 is provided with a front face image capturing device 9011 and at least one side face image capturing device 9012.

The client terminal device 901 may be configured to control, when a target user intends to make a payment using a target electronic account, the front face image capturing device 9011 to capture a front face image of the target user and the side face image capturing device 9012 to capture a side face image of the target user simultaneously; and send the captured front face image and side face image to the resource transfer server 902.

The resource transfer server 902 may be configured to acquire the front face image and the side face image of the target user; perform a liveness detection and an identity recognition on the target user based on the front face image and the side face image; and execute, if the liveness detection result is that the target user is a live user and the identity recognition result is that the target user is an authorized user of the target electronic account, resource transfer on the target electronic account.

The client terminal device 901 may be provided with one side face image capturing device or two side face image capturing devices. The system 900 in FIG. 9 shows an example of providing one side face image capturing device on the client terminal device 901. However, FIG. 9 is merely an illustrative example and does not constitute a limitation to a number of side face image capturing devices.

Figure 10:
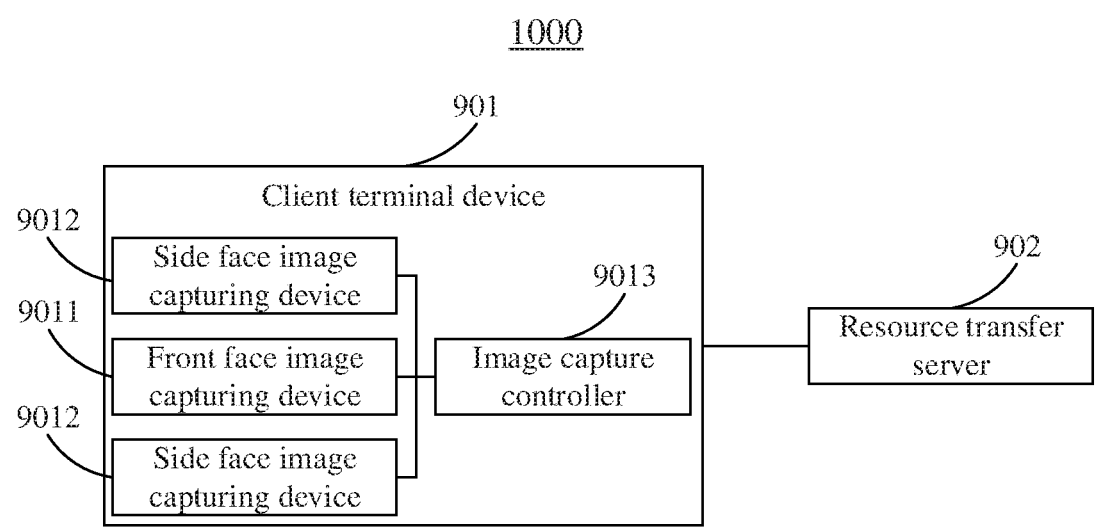
FIG. 10 is a schematic diagram of a system for resource transfer according to an embodiment.

FIG. 10 is a schematic diagram of a system 1000 for resource transfer according to an embodiment. Referring to FIG. 10, in the system 1000, in order to achieve the client terminal device being capable of controlling the front face image capturing device 9011 to capture the front face image of the target user and the side face image capturing devices 9012 to capture the side face age(s) of the target user simultaneously, the client terminal device 901 may also be provided with an image capture controller 9013, as shown in FIG. 10. The image capture controller 9013 is connected to the front face image capturing device 9011 and the side face image capturing devices 9012, and is configured to control the front face image capturing device 9011 to capture the front face image of the target user and the side face image capturing device(s) 9012 to capture the side face image(s) of the target user simultaneously.

The system 1000 in FIG. 10 is provided with two side face image capturing devices 9012 on the client terminal device 901. However, FIG. 10 is merely an illustrative example, and does not constitute a limitation to the number of side face image capturing devices.

In an embodiment, the resource transfer server 902 is configured to: perform a liveness detection on the target user based on the front face image and the side face image; and perform an identity recognition on the target user based on the front face image and the side face image if the liveness detection result is that the target user is a live user.

In an embodiment, the resource transfer server 902 is further configured to: input the front face image into a pre-trained first liveness detection model for processing to acquire a first probability outputted from the first liveness detection model; and input the side face image into a pre-trained second liveness detection model for processing to acquire a second probability outputted from the second liveness detection model; where the first probability and the second probability are each a probability that the target user is a live user; or the first probability and the second probability are each a probability that the target user is a non-live representation of a user; and identify whether the target user is a live user based on the first probability and the second probability.

In an embodiment, the resource transfer server 902 is further configured to: perform a fusion calculation on the first probability and the second probability to obtain a fusion result corresponding to the first probability and the second probability; and identify whether the target user is a live user based on the fusion result and a set probability threshold.

In an embodiment, the resource transfer server 902 is further configured to: input the front face image and the side face image into a pre-trained third liveness detection model for processing to acquire a third probability outputted from the third liveness detection model; where the third probability is a probability that the target user is a live user, or the third probability is a probability that the target user is a non-live representation of a user; and identify whether the target user is a live user based on the third probability and the set probability threshold.

In an embodiment, the resource transfer server 902 is further configured to: perform a similarity comparison between the front face image and a recorded front face image corresponding to the target electronic account; perform a similarity comparison between the side face image and a recorded side face image corresponding to the target electronic account; and perform an identity recognition on the target user based on a front face similarity and a side face similarity.

In an embodiment, the resource transfer server 902 is further configured to: standardize the side face image to obtain a standard side face image, where a size of the standard side face image is a set size, and a side face posture in the standard side face image is a set posture; extract a first side face feature vector of the target user based on the standard side face image; acquire a second side face feature vector corresponding to the recorded side face image; and calculate a similarity between the side face image and the recorded side face image based on the first side face feature vector and the second side face feature vector.

In an embodiment, the resource transfer server 902 is further configured to: determine the target user as an authorized user of the target electronic account if the front face similarity is greater than a first set threshold and the side face similarity is greater than a second set threshold.

Specific implementation of the functions corresponding to the resource transfer server 902 in the embodiments may be the same as the methods illustrated in FIG. 1 to FIG. 7. Therefore, the specific implementation of the functions corresponding to the resource transfer server 902 will not be repeated here.

Figure 11:
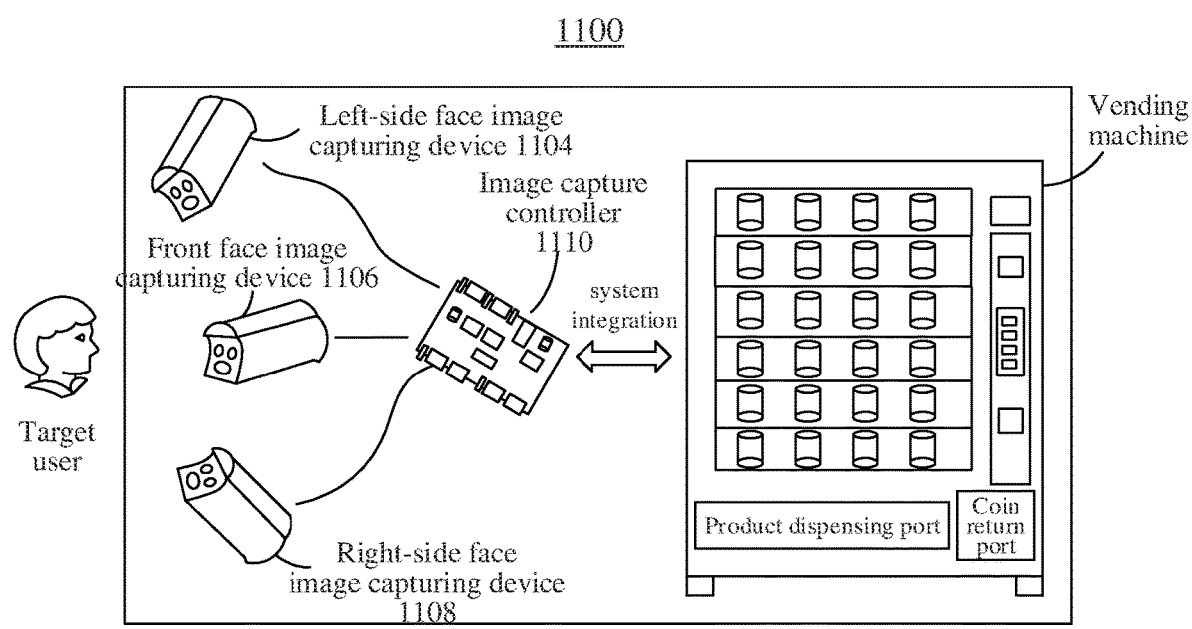
FIG. 11 is a schematic diagram of a client terminal device in a system for resource transfer according to an embodiment

FIG. 11 is a schematic diagram of a client terminal device 1100 in a system for resource transfer according to an embodiment. Referring to FIG. 11, the client terminal device 1100 may be a vending machine, including a left-side face image capturing device 1104, a right-side face image capturing device 1108, and a front face image capturing device 1106. In an embodiment, the front face image capturing device 1106 is placed in the center, the left-side face image capturing device 1104 is placed on a left side of the front face image capturing device 1106, and the right-side face image capturing device 1108 is placed on a right side of the front face image capturing device 1106.

In an embodiment, the left-side face image capturing device 1104, the front face image capturing device 1106, and the right-side face image capturing device 1108 may be cameras, and the three image capturing devices may to be connected to an image capture controller 1110, so that the image capture controller 1110 controls the three image capturers to capture face images of the target user simultaneously.

In an embodiment, the left-side face image capturing device 1104, the right-side face image capturing device 1108, the front face image capturing device 1106, and the image capture controller 1110 are integrated onto the vending machine provided with a payment client terminal to obtain a specific payment system, where the image capture controller 1110 may be a control circuit board.

In an embodiment, when making a payment sing the vending machine shown in FIG. 11, a human face may face to the front face image capturing device 1106.

In the system for resource transfer provided in the embodiments, whether a target user is an authorized user of a target electronic account is verified by an identity recognition based on a front face image and a side face image of the target user during resource transfer, and resource transfer can be carried out without entering a password by the user, thereby avoiding a situation that resource transfer cannot be carried out because the user forgets the password. In addition, whether the target user is a live user is verified by a liveness detection based on the front face image and the side face image, avoiding the problem of security risks in electronic accounts caused by face images of users being acquired by others, thereby improving the security of the electronic accounts. Moreover, more feature information is added by combining a front face image and a side face image during the liveness detection and the identity recognition, thereby improving the accuracy of the liveness detection and the identity recognition, and further protecting the security of users' electronic accounts.

Figure 12:
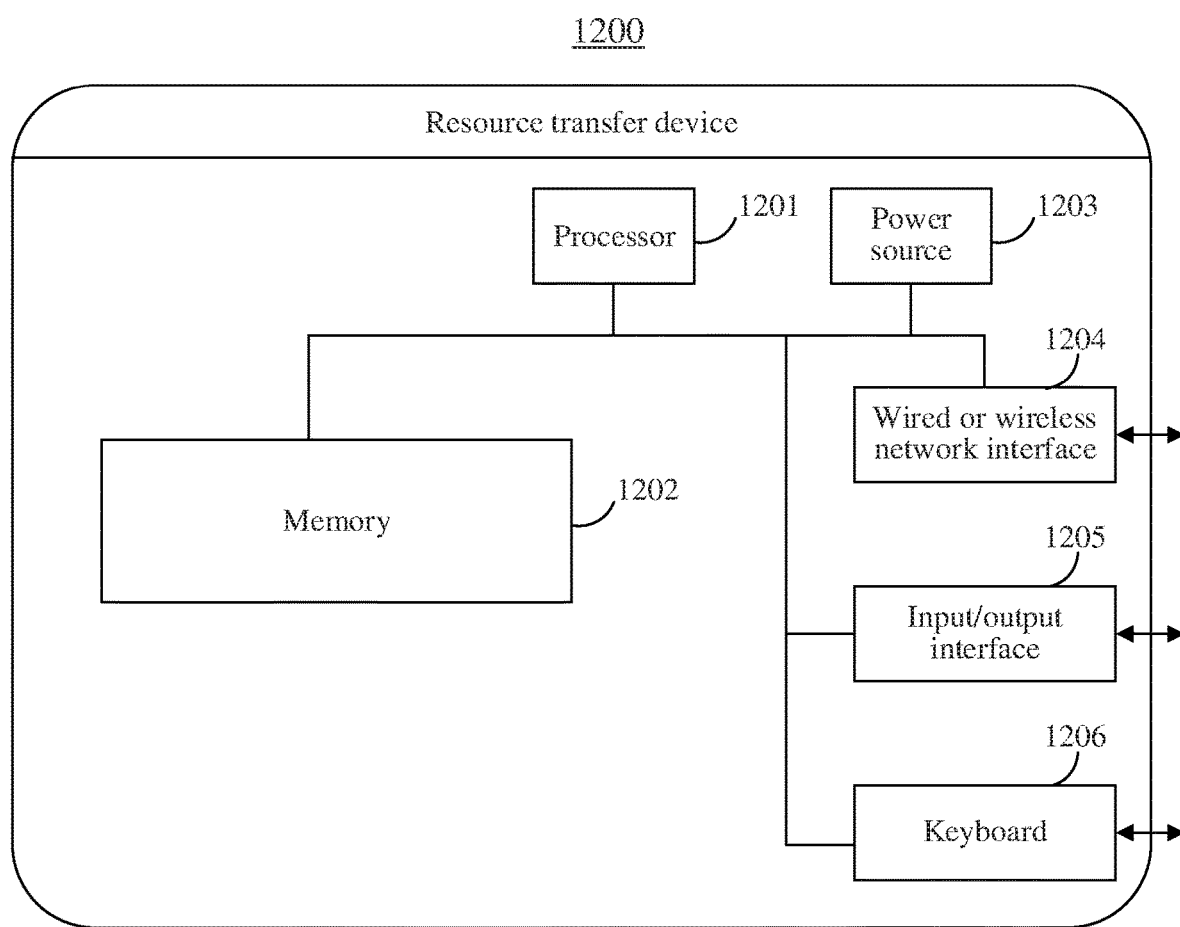
FIG. 12 is a schematic diagram of a device for resource transfer according to an embodiment.

FIG. 12 is a schematic diagram of a resource transfer device 1200 according to an embodiment. For example, the resource transfer device 1200 may implement any of the above described terminal device, server, or system for resource transfer. Referring to FIG. 12, the resource transfer device 1200 may include one or more processors 1201 and a memory 1202. The memory 1202 may store one or more storage application programs or data. The memory 1:202 may be temporary storage or persistent storage. An application program stored in the memory 1202 may include one or more modules (not shown in the figure). Each module may include a series of computer executable instructions in the resource transfer device 1200. The processor 1201 may communicate with the memory 1202 to execute the series of computer executable instructions in the memory 1202 on the resource transfer device. The resource transfer device 1200 may further include one or more power sources 1203, one or more wired or wireless network interfaces 1204, one or more input and output interfaces 1205, one or more keyboards 1206, and the like.

In an embodiment, one or more programs are stored in the memory 1202, and the one or more programs may include one or more modules. Each module may include a series of computer executable instructions in the resource transfer device 1200. The one or more processors 1201 are configured to execute the one or more programs to perform a method including: acquiring a front face image, and a side face image from at least one side, of a target user performing a liveness detection and an identity recognition on the target user based on the front face image and the side face image; and executing, if the liveness detection result is that the target user is a live user and the identity recognition result is that the target user is an authorized user of a target electronic account, resource transfer on the target electronic account.

In an embodiment, when the computer executable instructions are executed, performing the liveness detection and the identity recognition on the target user based on the front face image and the side face image may include: performing a liveness detection on the target user based on the front face image and the side face image; and performing an identity recognition on the target user based on the front face image and the side face image if the liveness detection result is that the target user is a live user.

In an embodiment, when the computer executable instructions are executed, performing the liveness detection on the target user based on the front face image and the side face image may include: inputting the front face image into a pre-trained first liveness detection model for processing to acquire a first probability outputted from the first liveness detection model; and inputting the side face image into a pre-trained second liveness detection model for processing to acquire a second probability outputted from the second liveness detection model; where the first probability and the second probability are each a probability that the target user is a live user; or the first probability and the second probability are each a probability that the target user is a non-live representation of a user; and identifying whether the target user is a live user based on the first probability and the second probability.

In an embodiment, when the computer executable instructions are executed, identifying whether the target user is a live user based on the first probability and the second probability may include: performing a fusion calculation on the first probability and the second probability to obtain a fusion result corresponding to the first probability and the second probability; and identifying whether the target user is a live user based on the fusion result and a set probability threshold.

In an embodiment, when the computer executable instructions are executed, performing the liveness detection on the target user based on the front face image and the side face image may include: inputting the front face image and the side face image into a pre-trained third liveness detection model for processing to acquire a third probability outputted from the third liveness detection model; where the third probability is a probability that the target user is a live user, or the third probability is a probability that the target user is a non-live representation of a user; and identifying whether the target user is a live user based on the third probability and the set probability threshold.

In an embodiment, when the computer executable instructions are executed, performing the identity recognition on the target user based on the front face image and the side face image may include: performing a similarity comparison between the front face image and a recorded front face image corresponding to the target electronic account; and performing a similarity comparison between side face image and a recorded side face image corresponding to the target electronic account; and performing identity recognition on the target user based on a front face similarity and a side face similarity.

In an embodiment, when the computer executable instructions are executed, the performing a similarity comparison between the side face image and a recorded side face image corresponding to the target electronic account may include: standardizing the side face image to obtain a standard side face image; where a size of the standard side face image is a set size, and a side face posture in the standard side face image is a set posture; extracting a first side face feature vector of the target user based on the standard side face image; and acquiring a second side face feature vector corresponding to the recorded side face image; and calculating a similarity between the side face image and the recorded side face image based on the first side face feature vector and the second side face feature vector.

In an embodiment, when the computer executable instructions are executed, the performing an identity recognition on the target user based on a front face similarity and a side face similarity may include: determining the target user as an authorized user of the target electronic account if the front face similarity is greater than a first set threshold and the side face similarity is greater than a second set threshold.

In the device for resource transfer provided in the embodiments of the specification, whether a target user is an authorized user of a target electronic account is verified by an identity recognition based on a front face image and a side face image of the target user during resource transfer, and resource transfer can be carried out without entering a password by a user, thereby avoiding a situation that resource transfer cannot be carried out because the user forgets the password. In addition, whether the target user is a live user is verified by a liveness detection based on the front face image and the side face image, avoiding the problem of security risks in electronic accounts caused by face images of users being acquired by others, thereby improving the security of the electronic accounts. Moreover, more feature information is added by combining a front face image and a side face image during the liveness detection and the identity recognition, thereby improving the accuracy of the liveness detection and the identity recognition, and further protecting the security of users' electronic accounts.

The embodiments of the specification further provide a storage medium configured to store a computer executable instruction. In an embodiment, the storage medium may be a USB flash disk, an optical disk, a hard disk, or the like. The computer executable instruction stored in the storage medium, when executed by a processor, may perform a method including: acquiring a front face image, and a side face image from at least one side, of a target user; performing a liveness detection and an identity recognition on the target user based on the front face image and the side face image; and executing, if the liveness detection result is that the target user is a live user and the identity recognition result is that the target user is an authorized user of a target electronic account, resource transfer on the target electronic account.

In an embodiment, when the computer executable instruction stored in the storage medium is executed by a processor, the performing a liveness detection and an identity recognition on the target user based on the front face image and the side face image may include: performing a liveness detection on the target user based on the front face image and the side face image; and performing an identity recognition on the target user based on the front face image and the side face image if the liveness detection result is that the target user is a live user.

In an embodiment, when the computer executable instruction stored in the storage medium is executed by a processor, the performing a liveness detection on the target user based on the front face image and the side face image may include: inputting the front face image into a pre-trained first liveness detection model for processing to acquire a first probability outputted from the first liveness detection model; and inputting the side face image into a pre-trained second liveness detection model for processing to acquire a second probability outputted from the second liveness detection model; where the first probability and the second probability are each a probability that the target user is a live user; or the first probability and the second probability are each a probability that the target user is a non-live representation of a user; and identifying whether the target user is a live user based on the first probability and the second probability.

In an embodiment, when the computer executable instruction stored in the storage medium is executed by a processor, the identifying whether the target user is a live user based on the first probability and the second probability may include: performing a fusion calculation on the first probability and the second probability to obtain a fusion result corresponding to the first probability and the second probability; and identifying whether the target user is a live user based on the fusion result and the set probability threshold.

In an embodiment, when the computer executable instruction stored in the storage medium is executed by a processor, the performing a liveness detection on the target user based on the front face image and the side face image may include: inputting the front face image and the side face image into a pre-trained third liveness detection model for processing to acquire a third probability outputted from the third liveness detection model; where the third probability is a probability that the target user is a live user, or the third probability is a probability that the target user is a non-live representation of a user; and identifying whether the target user is a live user based on the third probability and the set probability threshold.

In an embodiment, when the computer executable instruction stored in the storage medium is executed by a processor, the performing an identity recognition on the target user based on the front face image and the side face image may include: performing a similarity comparison between the front face image and a recorded front face image corresponding to the target electronic account; performing a similarity comparison between the side face image and a recorded side face image corresponding to the target electronic account; and performing an identity recognition on the target user based on a front face similarity and a side face similarity.

In an embodiment, when the computer executable instruction stored in the storage medium is executed by a processor, the performing a similarity comparison between the side face image and a recorded side face image corresponding to the target electronic account may include: standardizing the side face image to obtain a standard side face image; where a size of the standard side face image is a set size, and a side face posture in the standard side face image is a set posture; extracting a first side face feature vector of the target user based on the standard side face image; acquiring a second side face feature vector corresponding to the recorded side face image; and calculating a similarity between the side face image and the recorded side face image based on the first side face feature vector and the second side face feature vector.

In an embodiment, when the computer executable instruction stored in the storage medium is executed by a processor, the performing an identity recognition on the target user based on a front face similarity and a side face similarity may include: determining the target user as an authorized user of the target electronic account if the front face similarity is greater than a first set threshold and the side face similarity is greater than a second set threshold.

In an embodiment, when the computer executable instructions stored in the storage medium are executed by a processor, whether a target user is an authorized user of a target electronic account is verified by an identity recognition based on a front face image and a side face image of the target user during resource transfer, and resource transfer can be carried out without entering a password by a user, thereby avoiding a situation that resource transfer cannot be carried out because the user forgets the password. In addition, whether the target user is a live user is verified by liveness detection based on the front face image and the side face image, avoiding the problem of security risks in electronic accounts caused by face images of users being acquired by others, thereby improving the security of the electronic accounts. Moreover, more feature information is added by combining a front face image and a side face image during the liveness detection and the identity recognition, thereby improving the accuracy of the liveness detection and the identity recognition, and further protecting the security of users' electronic accounts.

Each of the above described methods, models, modules, and units may be implemented as software, or hardware, or a combination of software and hardware. For example, a Programmable Logic Device (PLD) (e.g., a Field Programmable Gate Array (FPGA)) is such an integrated circuit that its logic function is determined by a user through programming the device. A designer integrates a digital system onto a piece of PLD by independent programming without the need for requesting a chip manufacturer to design and make an application specific integrated circuit chip. Moreover, at present, instead of manually making an integrated circuit chip, this programming is also mostly implemented using logic compiler software, which is similar to a software compiler used for program development and writing. However, original code before the compilation needs to be written using a specific programming language, which is known as a Hardware Description Language (HDL). There is not just one, but many kinds of HDLs, such as ABEL (Advanced Boolean Expression Language), AHDL (Altera Hardware Description Language), Confluence, CUPL (Cornell University Programming Language), HDCal, JHDL (Java Hardware Description Language), Lava, Lola, MyHDL, PALASM, and RHDL (Ruby Hardware Description Language). At present, VHDL (Very-High-Speed Integrated Circuit Hardware Description Language) and Verilog are most widely used. Those skilled in the art should also be clear that, just by simple logic programming of a process using the above hardware description languages and programming the process into an integrated circuit, it will be very easy to obtain a hardware circuit implementing the logical process.

A controller can be implemented by any suitable approach in the above described device. For example, the controller can take a form of, e.g., a microprocessor or processor, a computer readable medium storing a computer readable program code (e.g., software or firmware) that can be executed by the (micro)processor, a logic gate, a switch, an Application Specific Integrated Circuit (ASIC), a programmable logic controller, or an embedded microcontroller. Examples of the controller include, but are not limited to, the following microcontrollers: ARC 625D, Atmel AT9ISAM, Microchip PIC1 8F26K20, and Silicone Labs C8051F320. The memory controller may also be implemented as a part of control logic of the memory. Those skilled in the art also know that, in addition to implementing the controller by a pure computer readable program code, the controller can also be caused to implement identical functions in the form of the logic gate, the switch, the application specific integrated circuit, the programmable logic controller, the embedded microcontroller, or the like completely by logic programming of process steps. Therefore, such a controller may also be considered as a hardware component, and an apparatus configured to implement various functions within the controller may also be considered as a structure within the hardware component. The apparatus configured to implement various functions may be considered as not only a software module implementing a method, but also a structure within the hardware component.

The system, apparatus, modules or units illustrated in the above-described embodiments may be specifically implemented by a computer chip or entity, or by a product having a certain function. A typical implementing device is a computer. Specifically, for example, the computer may be a personal computer, a laptop computer, a cell phone, a camera phone, a smart phone, a personal digital assistant, a media player, a navigation device, an e-mail device, a game console, a tablet computer, a wearable device, or a combination of any devices of these devices.

For ease of description, the above apparatus is described by dividing it into various units based on functions, and then the units are described respectively. The apparatus may also be implemented by implementing functions of the units in a given piece or more pieces of software and/or hardware.

It should be appreciated by those skilled in the art that the embodiments of the present application may be provided as a method, system, or computer program product. Accordingly, the embodiments may take the form of complete hardware embodiments, complete software embodiments, or embodiments combining software and hardware. Further, the embodiments may take a form of one or more computer program products implemented on a computer usable storage medium (including but not limited to a disk storage, a CD-ROM, an optical memory, etc.) containing a computer usable program code.

The present application is described with reference to the flowcharts and/or block diagrams of the method, device (system), and computer program product according to the embodiments of the present specification it should be understood that each process and/or block in the flowcharts and/or block diagrams, and a combination of processes and/or blocks in the flowcharts and/or block diagrams may be implemented by computer program instructions. The computer program instructions can be provided to a general purpose computer, a special purpose computer, an embedded processor, or a processor of another programmable data processing device to produce a machine, causing the instructions executed by a computer or the processor of another programmable data processing device to produce an apparatus configured to implement functions specified in one or more processes of the flowcharts and/or one or more blocks of the block diagrams.

These computer program instructions may also be stored in a computer readable memory capable of directing the computer or another programmable data processing device to function in a particular manner, such that e instructions stored in the computer readable memory produce an article of manufacture including an instructing apparatus. The instructing apparatus implements the functions specified in one or more processes of the flowcharts and/or one or more blocks of the block diagrams.

The computer program instructions can also be loaded into the computer or another programmable data processing device, causing a series of operation steps to be executed on the computer or another programmable device, to produce computer-implemented processing. Therefore, the instructions executed on the computer or another programmable device provide steps used for implementing the functions specified in one or more processes of the flowcharts and/or one or more blocks of the block diagrams.

The computer readable medium includes permanent/non-permanent media and removable/non-removable media that can achieve information storage by any method or technology. The information may be a computer readable instruction, a data structure, a program module, or other data. Examples of the computer storage medium include, but are not limited to, a phase-change random access memory (PRAM), a static random access memory (SRAM), a dynamic random access memory (DRAM), a random access memory (RAM) of other types, a read only memory (ROM), an electrically erasable programmable read only memory (EEPROM), flash RAM or other internal memory technologies, a compact disc read only memory (CD-ROM), a digital versatile disc (DVD) or other optical storage, a magnetic cassette tape, and a magnetic tape or magnetic disk storage or other magnetic storage device, or any other non-transmission medium, which can be configured to store information that can be accessed by the computing device. The computer readable medium excludes transitory media, e.g., a modulated data signal or a carrier wave.

It should also be noted that the terms "include," "comprise," or any other variations thereof are intended to cover a non-exclusive inclusion, such that a process, method, article, or device that comprises a list of elements not only includes those elements but further includes other elements not expressly listed, or further includes elements inherent to such process, method, article, or device. An element defined by "comprising . . . a" does not, without more constraints, preclude the existence of additional identical elements in the process, method, article, or device that comprises the element.

The embodiments may be implemented with a computer executable instruction executed by the computer, such as a program module. Generally, the program module includes a routine, a program, an object, a component, a data structure, and the like executing particular tasks or implementing particular abstract data types. The present application may also be practiced in distributed computing environments. In the distributed computing environments, tasks are executed by remote processing devices that are linked through a communication network. In the distributed computing environments, the program module may be located in local and remote computer storage media including a storage device.

Various embodiments in the present specification are described in a progressive manner, and identical or similar portions between the various embodiments may be referred to mutually. Each embodiment mainly describes differences from other embodiments. In particular, since the system embodiments are substantially similar to the method embodiments, the description is relatively simple, and for the relevant part, reference may be made to the description of the part of the method embodiments.

Although the specification has been described in conjunction with specific embodiments, may alternatives, modifications and variations will be apparent to those skilled in the art. Accordingly, the following claims embrace all such alternatives, modifications and variations that fall within the terms of the claims.

The invention claimed is:

1. A method for resource transfer, comprising:
acquiring a front face image, and a side face image from at least one side, of a target user;
performing a liveness detection and an identity recognition on the target user based on the front face image and the side face image; and
executing, if a liveness detection result is that the target user is a live user and an identity recognition result is that the target user is an authorized user of a target electronic account, resource transfer on the target electronic account,
wherein the performing the identity recognition on the target user comprises:
performing a first similarity comparison between the front face image of the target user and a recorded front face image corresponding to the target electronic account;
performing a second similarity comparison between the side face image of the target user and a recorded side face image corresponding to the target electronic account; and
performing the identity recognition on the target user based on a front face similarity determined from the first similarity comparison and a side face similarity determined from the second similarity comparison,
wherein the performing the second similarity comparison comprises:
standardizing the side face image of the target user to obtain a standard side face image, wherein a size of the standard side face image is a set size, and a side face posture in the standard side face image is a set posture;
extracting a first side face feature vector of the target user based on the standard side face image;
acquiring a second side face feature vector corresponding to the recorded side face image; and
calculating a similarity between the side face image of the target user and the recorded side face image based on the first side face feature vector and the second side face feature vector.

2. The method according to claim 1, wherein the performing the liveness detection on the target user based on the front face image and the side face image comprises:
inputting the front face image of the target user into a pre-trained first liveness detection model for processing to acquire a first probability outputted from the first liveness detection model;
inputting the side face image of the target user into a pre-trained second liveness detection model for processing to acquire a second probability outputted from the second liveness detection model; and
identifying whether the target user is a live user based on the first probability and the second probability,
wherein the first probability and the second probability are:
each a probability that the target user is a live user, or each a probability that the target user is a non-live representation of a user.

3. The method according to claim 2, wherein the identifying whether the target user is a live user based on the first probability and the second probability comprises:
performing a fusion calculation on the first probability and the second probability to obtain a fusion result corresponding to the first probability and the second probability; and
identifying whether the target user is a live user based on the fusion result and a set probability threshold.

4. The method according to claim 1, wherein the performing the liveness detection on the target user based on the front face image and the side face image comprises:
inputting the front face image and the side face image of the target user into a pre-trained liveness detection model for processing to acquire a probability outputted from the liveness detection model; and
identifying whether the target user is a live user based on the probability and a set probability threshold,
wherein the probability is:
a probability that the target user is a live user, or
a probability that the target user is a non-live representation of a user.

5. The method according to claim 1, wherein the performing the identity recognition on the target user based on the first similarity and the second similarity comprises:
determining the target user as an authorized user of the target electronic account if the front face similarity is greater than a first set threshold and the side face similarity is greater than a second set threshold.

6. A device for resource transfer, comprising:
a processor; and
a memory configured to store instructions, wherein the processor is configured to execute the instructions to:
acquire a front face image, and a side face image from at least one side, of a target user;
perform a liveness detection and an identity recognition on the target user based on the front face image and the side face image; and
execute, if a liveness detection result is that the target user is a live user and an identity recognition result is that the target user is an authorized user of a target electronic account, resource transfer on the target electronic account,
wherein in performing the identity recognition on the target user, the processor is further configured to execute the instructions to:
perform a first similarity comparison between the front face image of the target user and a recorded front face image corresponding to the target electronic account;
perform a second similarity comparison between the side face image of the target user and a recorded side face image corresponding to the target electronic account; and
perform the identity recognition on the target user based on a front face similarity determined from the first similarity comparison and a side face similarity determined from the second similarity comparison,
wherein in performing the second similarity comparison, the processor is further configured to execute the instructions to:
standardize the side face image of the target user to obtain a standard side face image, wherein a size of the standard side face image is a set size, and a side face posture in the standard side face image is a set posture;
extract a first side face feature vector of the target user based on the standard side face image;
acquire a second side face feature vector corresponding to the recorded side face image; and
calculate a similarity between the side face image of the target user and the recorded side face image based on the first side face feature vector and the second side face feature vector.

7. The device according to claim 6, wherein the processor is further configured to execute the instructions to:
input the front face image of the target user into a pre-trained first liveness detection model for processing to acquire a first probability outputted from the first liveness detection model;
input the side face image of the target user into a pre-trained second liveness detection model for processing to acquire a second probability outputted from the second liveness detection model; and
identify whether the target user is a live user based on the first probability and the second probability,
wherein the first probability and the second probability are:
each a probability that the target user is a live user; or
each a probability that the target user is a non-live representation of a user.

8. The device according to claim 6, wherein the processor is further configured to execute the instructions to:
input the front face image and the side face image of the target user into a pre-trained liveness detection model for processing to acquire a probability outputted from the liveness detection model; and
identify whether the target user is a live user based on the probability and a set probability threshold,
wherein the probability is:
a probability that the target user is a live user, or
a probability that the target user is a non-live representation of a user.

9. The device according to claim 7, wherein the processor is further configured to execute the instructions to:
perform a fusion calculation on the first probability and the second probability to obtain a fusion result corresponding to the first probability and the second probability; and
identify whether the target user is a live user based on the fusion result and a set probability threshold.

10. The device according to claim 6, wherein the processor is further configured to execute the instructions to:
determine the target user as an authorized user of the target electronic account if the front face similarity is greater than a first set threshold and the side face similarity is greater than a second set threshold.

11. A system for resource transfer, comprising:
a client terminal device; and
a resource transfer server,
wherein the client terminal device is provided with a front face image capturing device and at least one side face image capturing device,
wherein the client terminal device is configured to control the front face image capturing device to capture a front face image of a target user and the side face image capturing device to capture a side face image of the target user simultaneously; and send the front face image and the side face image to the resource transfer server, and wherein the resource transfer server is configured to:
acquire the front face image and the side face image of the target user;
perform a liveness detection and an identity recognition on the target user based on the front face image and the side face image; and
execute, if a liveness detection result is that the target user is a live user and an identity recognition result is that the target user is an authorized user of a target electronic account, resource transfer on the target electronic account,
wherein in performing the identity recognition on the target user, the resource transfer server is further configured to:
perform a first similarity comparison between the front face image of the target user and a recorded front face image corresponding to the target electronic account;
perform a second similarity comparison between the side face image of the target user and a recorded side face image corresponding to the target electronic account; and
perform the identity recognition on the target user based on a front face similarity determined from the first similarity comparison and a side face similarity determined from the second similarity comparison,
wherein in performing the second similarity comparison, the resource transfer server is further configured to:
standardize the side face image of the target user to obtain a standard side face image, wherein a size of the standard side face image is a set size, and a side face posture in the standard side face image is a set posture;
extract a first side face feature vector of the target user based on the standard side face image;
acquire a second side face feature vector corresponding to the recorded side face image; and
calculate a similarity between the side face image of the target user and the recorded side face image based on the first side face feature vector and the second side face feature vector.

12. The system according to claim 11, wherein the resource transfer server is further configured to:
input the front face image of the target user into a pre-trained first liveness detection model for processing to acquire a first probability outputted from the first liveness detection model;
input the side face image of the target user into a pre-trained second liveness detection model for processing to acquire a second probability outputted from the second liveness detection model; and
identify whether the target user is a live user based on the first probability and the second probability,
wherein the first probability and the second probability are:
each a probability that the target user is a live user; or
each a probability that the target user is a non-live representation of a user.

13. The system according to claim 11, wherein the resource transfer server is further configured to:
input the front face image and the side face image of the target user into a pre-trained liveness detection model for processing to acquire a probability outputted from the liveness detection model; and
identify whether the target user is a live user based on the probability and a set probability threshold, wherein the probability is:
- a probability that the target user is a live user, or
- a probability that the target user is a non-live representation of a user.

* * * * *